US010237902B2

(12) United States Patent
Zhao et al.

(10) Patent No.: US 10,237,902 B2
(45) Date of Patent: Mar. 19, 2019

(54) LOGICAL LINK CONTROL PROTOCOL LLCP BASED SERVICE DISCOVERY METHOD AND NFC CONTROLLER

(71) Applicant: Huawei Technologies Co., Ltd., Shenzhen (CN)

(72) Inventors: Xiaona Zhao, Beijing (CN); Xinmiao Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/566,974

(22) PCT Filed: Apr. 16, 2015

(86) PCT No.: PCT/CN2015/076693
§ 371 (c)(1),
(2) Date: Oct. 16, 2017

(87) PCT Pub. No.: WO2016/165093
PCT Pub. Date: Oct. 20, 2016

(65) Prior Publication Data
US 2018/0084592 A1 Mar. 22, 2018

(51) Int. Cl.
*H04L 29/06* (2006.01)
*H04W 8/00* (2009.01)
(Continued)

(52) U.S. Cl.
CPC ........... *H04W 76/11* (2018.02); *H04L 69/324* (2013.01); *H04W 4/00* (2013.01); *H04W 4/80* (2018.02);
(Continued)

(58) Field of Classification Search
CPC combination set(s) only.
See application file for complete search history.

(56) References Cited

U.S. PATENT DOCUMENTS

2013/0078920 A1   3/2013   Hillan
2013/0165042 A1*  6/2013   Gillespie ............. H04W 76/068
                                                   455/41.1
(Continued)

FOREIGN PATENT DOCUMENTS

CN    103828408 A    5/2014
EP     2861037 A1    4/2015
(Continued)

OTHER PUBLICATIONS

"NFC Controller Interface (NCI)," Technical Specification, Version 1.1, pp. i-157, NFC Forum (Jan. 23, 2014).
(Continued)

*Primary Examiner* — Nay A Maung
*Assistant Examiner* — Erica L Fleming-Hall
(74) *Attorney, Agent, or Firm* — Leydig, Voit & Mayer, Ltd.

(57) ABSTRACT

Embodiments of the present invention disclose a LLCP based service discovery method and an NFC controller. The method includes: after receiving an LLC PDU, determining, by an NFCC according to a type identifier in a packet header of the LLC PDU, whether the LLC PDU is a target LLC PDU, where the target LLC PDU includes a CONNECT PDU sent by a DH or a second NFC device, an SNL PDU sent by the second NFC device, or an AGF PDU sent by the second NFC device; when the LLC PDU is the target LLC PDU, determining, by the NFCC, whether a service discovery procedure needs to be performed; and if the service discovery procedure needs to be performed, performing, by the NFCC, the service discovery procedure.

20 Claims, 8 Drawing Sheets

(51) Int. Cl.
    *H04W 4/00* (2018.01)
    *H04W 76/11* (2018.01)
    *H04W 4/80* (2018.01)
    *H04L 29/08* (2006.01)
(52) U.S. Cl.
    CPC .............. *H04W 8/00* (2013.01); *H04W 8/005* (2013.01); *H04L 67/04* (2013.01); *H04L 67/16* (2013.01)

(56) References Cited

U.S. PATENT DOCUMENTS

| | | | |
|---|---|---|---|
| 2013/0322296 A1* | 12/2013 | Arunan | H04L 61/20 370/254 |
| 2014/0112476 A1* | 4/2014 | Teruyama | H04L 63/0428 380/270 |
| 2014/0194060 A1 | 7/2014 | Teruyama | |
| 2014/0355057 A1* | 12/2014 | Jang | G06K 7/10297 358/1.15 |
| 2016/0021536 A1* | 1/2016 | Teruyama | H04W 76/10 713/169 |
| 2016/0381621 A1* | 12/2016 | Kim | G06Q 30/0241 370/329 |
| 2017/0091768 A1* | 3/2017 | Yoon | G06Q 20/3229 |

FOREIGN PATENT DOCUMENTS

| | | |
|---|---|---|
| JP | 2012118570 A | 6/2012 |
| JP | 2014511601 A | 5/2014 |
| JP | 2015505215 A | 2/2015 |

OTHER PUBLICATIONS

"NFC Controller Interface (NCI)," Technical Specification, Version 2.0, Draft 4, pp. i-184, NFC Forum (Jul. 31, 2014).

* cited by examiner

LOGICAL LINK CONTROL PROTOCOL LLCP BASED SERVICE DISCOVERY METHOD AND NFC CONTROLLER

CROSS-REFERENCE TO RELATED APPLICATIONS

This application is a national stage application of International Application No. PCT/CN2015/076693, filed on Apr. 16, 2015, which is hereby incorporated by reference in its entirety.

TECHNICAL FIELD

Embodiments of the present invention relate to the field of near field communication (NFC) technologies, and specifically, to a Logical Link Control Protocol (LLCP) based service discovery method and an NFC controller.

BACKGROUND

An NFC technology is a short-distance wireless connection technology. According to the technology, near field communication between electronic devices having NFC functions (or referred to as "NFC devices") may be implemented by means of magnetic field sensing. In the NFC technology, an NFC controller interface (NCI) protocol mainly defines a logical interface for communication between a device host (DH) in an NFC device and an NFC controller (NFCC).

If two NFC devices performing point-to-point communication use a Logical Link Control Protocol (LLCP), it can be known according to the LLCP that, before the two NFC devices performing point-to-point communication performs upper-layer information unit exchange by means of a service (a connectionless service or a connection-oriented service), each of the two NFC devices needs to learn a service access point (SAP) that is allocated by the other NFC device for the service. If one of the NFC devices does not learn an SAP that is allocated by the other NFC device for the service, the NFC device needs to learn, by means of a service discovery procedure (SDP), the SAP that is allocated by the other NFC device for the service.

According to the existing NCI protocol, after one of the NFC devices receives a Logical Link Control protocol data unit (LLC PDU) sent by the other NFC device at a peer end, an NFCC of the NFC device needs to forward the LLC PDU to a DH, so that the DH performs processing and makes a reply, and then sends the reply of the DH to the peer end. In a service discovery procedure, for example, each time one of the NFC devices receives a service name lookup protocol data unit (SNL PDU) including a service discovery request (SDREQ) or a connect protocol data unit (CONNECT PDU) including a service name (SN), an NFCC of the NFC device needs to forward the PDU to a DH, waits for a reply made by the DH, and then feeds back the reply to a peer end by using the NFCC. Multiple interactions between the NFCC and the DH in the service discovery procedure cause relatively high resource overheads.

SUMMARY

Embodiments of the present invention disclose a Logical Link Control Protocol (LLCP) based service discovery method and an NFC controller, to reduce interactions between an NFCC and a DH in an NFC device, and reduce resource overheads.

According to a first aspect of the embodiments of the present invention, a Logical Link Control Protocol (LLCP) based service discovery method is disclosed, where the method is applied to an NFC controller NFCC of a first near field communication NFC device, the first NFC device further includes a device host DH, and the method includes:

receiving, by the NFCC, a Logical Link Control protocol data unit LLC PDU;

determining, by the NFCC according to a type identifier in a packet header of the LLC PDU, whether the LLC PDU is a target LLC PDU, where the target LLC PDU includes a first connect protocol data unit CONNECT PDU sent by the DH or a second NFC device, a service name lookup protocol data unit SNL PDU sent by the second NFC device, or an aggregated frame protocol data unit AGF PDU sent by the second NFC device;

when the LLC PDU is the target LLC PDU, determining, by the NFCC, whether a service discovery procedure needs to be performed; and if the service discovery procedure needs to be performed, performing, by the NFCC, the service discovery procedure.

In a first possible implementation of the first aspect of the embodiments of the present invention, when the LLC PDU is the SNL PDU, the determining, by the NFCC, whether a service discovery procedure needs to be performed includes:

determining, by the NFCC, whether a parameter included in an information field of the SNL PDU is a first service discovery request SDREQ, and the performing, by the NFCC, the service discovery procedure includes:

determining, by the NFCC from prestored service information, a first service access point SAP corresponding to a first service name SN included in the first SDREQ, where the service information includes at least one SN and an SAP corresponding to each SN; and generating, by the NFCC, a first service discovery response SDRES including the first SAP, and sending the first SDRES to the second NFC device.

With reference to the first aspect of the embodiments of the present invention, in a second possible implementation of the first aspect of the embodiments of the present invention, when the LLC PDU is the first CONNECT PDU, the determining, by the NFCC, whether a service discovery procedure needs to be performed includes:

determining, by the NFCC, whether a value of a target service access point DSAP field in a packet header of the first CONNECT PDU is equal to a preset value; and determining, by the NFCC when the value of the DSAP field is equal to the preset value, whether a second SN can be parsed out from an information field of the first CONNECT PDU; and the performing, by the NFCC, the service discovery procedure includes:

generating, by the NFCC, a second SDREQ including the second SN, and sending the second SDREQ to the second NFC device; and receiving, by the NFCC, a second SDRES that is sent by the second NFC device in response to the second SDREQ, where the second SDRES includes a second SAP.

With reference to the second possible implementation of the first aspect of the embodiments of the present invention, in a third possible implementation of the first aspect of the embodiments of the present invention, when the first CONNECT PDU is sent by the DH, after the performing, by the NFCC, the service discovery procedure, the method further includes:

generating, by the NFCC, a second CONNECT PDU, and sending the second CONNECT PDU to the second NFC device, where a source service access point SSAP in the second CONNECT PDU is an SSAP in the first CONNECT PDU or a third SAP that is found by the NFCC by querying prestored service information and that corresponds to the second SN, a DSAP in the second CONNECT PDU is the second SAP, and the service information includes at least one SN and an SAP corresponding to each SN.

With reference to the second possible implementation of the first aspect of the embodiments of the present invention, in a fourth possible implementation of the first aspect of the embodiments of the present invention, when the first CONNECT PDU is sent by the second NFC device, after the performing, by the NFCC, the service discovery procedure, the method further includes:

generating, by the NFCC, a connect complete protocol data unit CC PDU, and sending the CC PDU to the second NFC device, where an SSAP in the CC PDU is a fourth SAP that is in prestored service information and that corresponds to the second SN, a DSAP in the CC PDU is the second SAP, the CC PDU is used to indicate that a data link connection between the first NFC device and the second NFC device is successfully established, and the service information includes at least one SN and an SAP corresponding to each SN; and sending, by the NFCC to the DH, indication information corresponding to the first CONNECT PDU and indication information used to indicate that the data link connection is successfully established, where the indication information corresponding to the first CONNECT PDU includes the second SAP.

With reference to the first aspect of the embodiments of the present invention, in a fifth possible implementation of the first aspect of the embodiments of the present invention, the AGF PDU includes at least one SNL PDU and/or at least one CONNECT PDU.

With reference to the first aspect of the embodiments of the present invention, in a sixth possible implementation of the first aspect of the embodiments of the present invention, before the performing, by the NFCC, the service discovery procedure, the method further includes:

receiving, by the NFCC, a start command sent by the DH, where the start command is used to command the NFCC to start a function of performing the service discovery procedure; or determining, by the NFCC, that the NFCC has a capability of performing the service discovery procedure.

With reference to the first possible implementation, the third possible implementation, or the fourth possible implementation of the first aspect of the embodiments of the present invention, in a seventh possible implementation of the first aspect of the embodiments of the present invention, the service information is sent to the NFCC by the DH.

With reference to the first aspect of the embodiments of the present invention, in an eighth possible implementation of the first aspect of the embodiments of the present invention, before the receiving, by the NFCC, a Logical Link Control protocol data unit LLC PDU, the method further includes:

reporting, by the NFCC, capability information to the DH, where the capability information is used to indicate that the NFCC has a capability of performing a service discovery procedure.

According to a second aspect of the embodiments of the present invention, an NFC controller is disclosed, where the NFC controller is an NFC controller in a first NFC device, the first NFC device further includes a DH, and the NFC controller includes:

a communications module, configured to receive an LLC PDU;

a first judging module, configured to determine, according to a type identifier in a packet header of the LLC PDU, whether the LLC PDU is a target LLC PDU, where the target LLC PDU includes a first CONNECT PDU sent by the DH or a second NFC device, an SNL PDU sent by the second NFC device, or an AGF PDU sent by the second NFC device;

a second judging module, configured to: when a determining result of the first judging module is that the LLC PDU is the target LLC PDU, determine whether a service discovery procedure needs to be performed; and a performing module, configured to perform the service discovery procedure when a determining result of the second judging module is that the service discovery procedure needs to be performed.

In a first possible implementation of the second aspect of the embodiments of the present invention, when the LLC PDU is the SNL PDU, a specific manner of determining, by the second judging module, whether a service discovery procedure needs to be performed is:

determining whether a parameter included in an information field of the SNL PDU is a first service discovery request SDREQ; and a specific manner of performing, by the performing module, the service discovery procedure is:

determining, from prestored service information, a first SAP corresponding to a first SN included in the first SDREQ, where the service information includes at least one SN and an SAP corresponding to each SN; and generating a first SDRES including the first SAP, and sending the first SDRES to the second NFC device by using the communications module.

With reference to the second aspect of the embodiments of the present invention, in a second possible implementation of the second aspect of the embodiments of the present invention, when the LLC PDU is the first CONNECT PDU, a specific manner of determining, by the second judging module, whether a service discovery procedure needs to be performed is:

determining whether a value of a DSAP field in a packet header of the first CONNECT PDU is equal to a preset value; and determining, when the value of the DSAP field is equal to the preset value, whether a second SN can be parsed out from an information field of the first CONNECT PDU; and a specific manner of performing, by the performing module, the service discovery procedure is:

generating a second SDREQ including the second SN, and sending the second SDREQ to the second NFC device by using the communications module; and receiving, by using the communications module, a second SDRES that is sent by the second NFC device in response to the second SDREQ, where the second SDRES includes a second SAP.

With reference to the second possible implementation of the second aspect of the embodiments of the present invention, in a third possible implementation of the second aspect of the embodiments of the present invention, the NFC controller further includes a first generation module, where the first generation module is configured to: when the first CONNECT PDU is sent by the DH, after the performing module performs the service discovery procedure, generate a second CONNECT PDU, where an SSAP in the second CONNECT PDU is an SSAP in the first CONNECT PDU or a third SAP that is found by the NFC controller by querying prestored service information and that corresponds to the second SN, a DSAP in the second CONNECT PDU is the second SAP, and the service information includes at least one SN and an SAP corresponding to each SN; and the communications module is further configured to send the second CONNECT PDU to the second NFC device.

With reference to the second possible implementation of the second aspect of the embodiments of the present invention, in a fourth possible implementation of the second aspect of the embodiments of the present invention, the NFC controller further includes a second generation module, where the second generation module is configured to: when the first CONNECT PDU is sent by the second NFC device, after the performing module performs the service discovery procedure, generate a CC PDU, where an SSAP in the CC PDU is a fourth SAP that is in prestored service information and that corresponds to the second SN, a DSAP in the CC PDU is the second SAP, the CC PDU is used to indicate that a data link connection between the first NFC device and the second NFC device is successfully established, and the service information includes at least one SN and an SAP corresponding to each SN; and the communications module is further configured to send the CC PDU to the second NFC device, and send, to the DH, indication information corresponding to the first CONNECT PDU and indication information used to indicate that the data link connection is successfully established, where the indication information corresponding to the first CONNECT PDU includes the second SAP.

With reference to the second aspect of the embodiments of the present invention, in a fifth possible implementation of the second aspect of the embodiments of the present invention, the AGF PDU includes at least one SNL PDU and/or at least one CONNECT PDU.

With reference to the second aspect of the embodiments of the present invention, in a sixth possible implementation of the second aspect of the embodiments of the present invention, the communications module is further configured to: before the performing module performs the service discovery procedure, receive a start command sent by the DH, where the start command is used to command the NFC controller to start a function of performing the service discovery procedure; or the NFC controller further includes a determining module, where the determining module is configured to determine that the NFC controller has a capability of performing the service discovery procedure.

With reference to the first possible implementation, the third possible implementation, or the fourth possible implementation of the second aspect of the embodiments of the present invention, in a seventh possible implementation of the second aspect of the embodiments of the present invention, the service information is sent to the NFC controller by the DH.

With reference to the second aspect of the embodiments of the present invention, in an eighth possible implementation of the second aspect of the embodiments of the present invention, the communications module is further configured to report capability information to the DH, where the capability information is used to indicate that the NFC controller has a capability of performing a service discovery procedure.

According to a third aspect of the embodiments of the present invention, an NFC controller is disclosed, including a memory, a processor, and a communications apparatus, where the NFC controller is an NFC controller in a first NFC device, the first NFC device further includes a DH, and the communications apparatus is configured to receive an LLC PDU; and the memory stores a set of program code, and the processor is configured to invoke the program code stored in the memory, to perform the following operations:

determining, according to a type identifier in a packet header of the LLC PDU, whether the LLC PDU is a target LLC PDU, where the target LLC PDU includes a first CONNECT PDU sent by the DH or a second NFC device, an SNL PDU sent by the second NFC device, or an AGF PDU sent by the second NFC device; and when the LLC PDU is the target LLC PDU, determining whether a service discovery procedure needs to be performed, and if the service discovery procedure needs to be performed, performing the service discovery procedure.

In a first possible implementation of the third aspect of the embodiments of the present invention, when the LLC PDU is the SNL PDU, a specific manner of determining, by the processor, whether a service discovery procedure needs to be performed is:

determining whether a parameter included in an information field of the SNL PDU is a first SDREQ; and a specific manner of performing, by the processor, the service discovery procedure is:

determining, from prestored service information, a first SAP corresponding to a first SN included in the first SDREQ, where the service information includes at least one SN and an SAP corresponding to each SN; and generating a first SDRES including the first SAP, and sending the first SDRES to the second NFC device by using the communications apparatus.

With reference to the third aspect of the embodiments of the present invention, in a second possible implementation of the third aspect of the embodiments of the present invention, when the LLC PDU is the first CONNECT PDU, a specific manner of determining, by the processor, whether a service discovery procedure needs to be performed is:

determining whether a value of a DSAP field in a packet header of the first CONNECT PDU is equal to a preset value; and determining, when the value of the DSAP field is equal to the preset value, whether a second SN can be parsed out from an information field of the first CONNECT PDU; and a specific manner of performing, by the processor, the service discovery procedure is:

generating a second SDREQ including the second SN, and sending the second SDREQ to the second NFC device by using the communications apparatus; and receiving, by using the communications apparatus, a second SDRES that is sent by the second NFC device in response to the second SDREQ, where the second SDRES includes a second SAP.

With reference to the second possible implementation of the third aspect of the embodiments of the present invention, in a third possible implementation of the third aspect of the embodiments of the present invention, the processor is configured to invoke the program code stored in the memory, to further perform the following operation:

when the first CONNECT PDU is sent by the DH, after the service discovery procedure is performed, generating a second CONNECT PDU, where an SSAP in the second CONNECT PDU is an SSAP in the first CONNECT PDU or a third SAP that is found by the NFC controller by querying prestored service information and that corresponds to the second SN, a DSAP in the second CONNECT PDU is the second SAP, and the service information includes at least one SN and an SAP corresponding to each SN; and the communications apparatus is further configured to send the second CONNECT PDU to the second NFC device.

With reference to the second possible implementation of the third aspect of the embodiments of the present invention, in a fourth possible implementation of the third aspect of the embodiments of the present invention, the processor is configured to invoke the program code stored in the memory, to further perform the following operation:

when the first CONNECT PDU is sent by the second NFC device, after the service discovery procedure is performed, generating a CC PDU, where an SSAP in the CC PDU is a fourth SAP that is in prestored service information and that corresponds to the second SN, a DSAP in the CC PDU is the second SAP, the CC PDU is used to indicate that a data link connection between the first NFC device and the second NFC device is successfully established, and the service information includes at least one SN and an SAP corresponding to each SN; and the communications apparatus is further configured to send the CC PDU to the second NFC device, and send, to the DH, indication information corresponding to the first CONNECT PDU and indication information used to indicate that the data link connection is successfully established, where the indication information corresponding to the first CONNECT PDU includes the second SAP.

With reference to the third aspect of the embodiments of the present invention, in a fifth possible implementation of the third aspect of the embodiments of the present invention, the AGF PDU includes at least one SNL PDU and/or at least one CONNECT PDU.

With reference to the third aspect of the embodiments of the present invention, in a sixth possible implementation of the third aspect of the embodiments of the present invention, the communications apparatus is further configured to: before the processor performs the service discovery procedure, receive a start command sent by the DH, where the start command is used to command the NFC controller to start a function of performing the service discovery procedure; or the processor is configured to invoke the program code stored in the memory, to further perform the following operation:

determining that the NFC controller has a capability of performing the service discovery procedure.

With reference to the first possible implementation, the third possible implementation, or the fourth possible implementation of the third aspect of the embodiments of the present invention, in a seventh possible implementation of the third aspect of the embodiments of the present invention, the service information is sent to the NFC controller by the DH.

With reference to the third aspect of the embodiments of the present invention, in an eighth possible implementation of the third aspect of the embodiments of the present invention, the communications apparatus is further configured to report capability information to the DH, where the capability information is used to indicate that the NFC controller has a capability of performing a service discovery procedure.

In the embodiments of the present invention, after receiving an LLC PDU an NFCC determines, according to a type identifier in a packet header of the LLC PDU, whether the LLC PDU is a target LLC PDU. The target LLC PDU includes a CONNECT PDU sent by a DH or a second NFC device, an SNL PDU sent by the second NFC device, or an AGF PDU sent by the second NFC device. When the LLC PDU is the target LLC PDU, the NFCC determines whether a service discovery procedure needs to be performed. If the service discovery procedure needs to be performed, the NFCC performs the service discovery procedure. It can be learned that, in the embodiments of the present invention, the NFCC can perform the service discovery procedure, thereby reducing interactions between the NFCC and the DH, reducing resource overheads, and improving communication efficiency. In addition, the NFCC can perform some functions of the DH, such as the service discovery procedure, which conforms to a trend that a logical interface between the DH and the NFCC develops towards upper layers in a point-to-point mode.

BRIEF DESCRIPTION OF DRAWINGS

To describe technical solutions in embodiments of the present invention more clearly, the following briefly describes the accompanying drawings. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose a LLCP based service discovery method and an NFC controller, so that an NFCC can perform a service discovery procedure, thereby reducing interactions between the NFCC and a DH, reducing resource overheads, and improving communication efficiency. The following provides detailed descriptions separately.

It should be noted that, the device host DH and the NFC controller NFCC that are used in the embodiments of the present invention are terms used in the NCI protocol formulated by the NFC Forum. The DH is configured to manage an entire NFC device, and the management includes management of the NFC controller, such as initialization, configuration, or power management. The DH may correspond to a CPU of a smartphone. The DH may correspond to a terminal host specified in a host controller interface (HCI) specification made by the European Telecommunication Standards Institute (ETSI). In addition, if a managing entity (ME) specified in a specification made by the Global Platform (GP) is implemented in the terminal host, the DH may be referred to as a managing host (MH). The NFCC is an entity on an NFC chip and is responsible for data transmission. Usually, the NFCC is directly used to represent the NFC chip. The NFCC may correspond to a contactless front-end (CLF) specified in the HCI specification made by the ETSI. In this case, a host controller in the HCI needs to be implemented in the NFCC.

Figure 1:
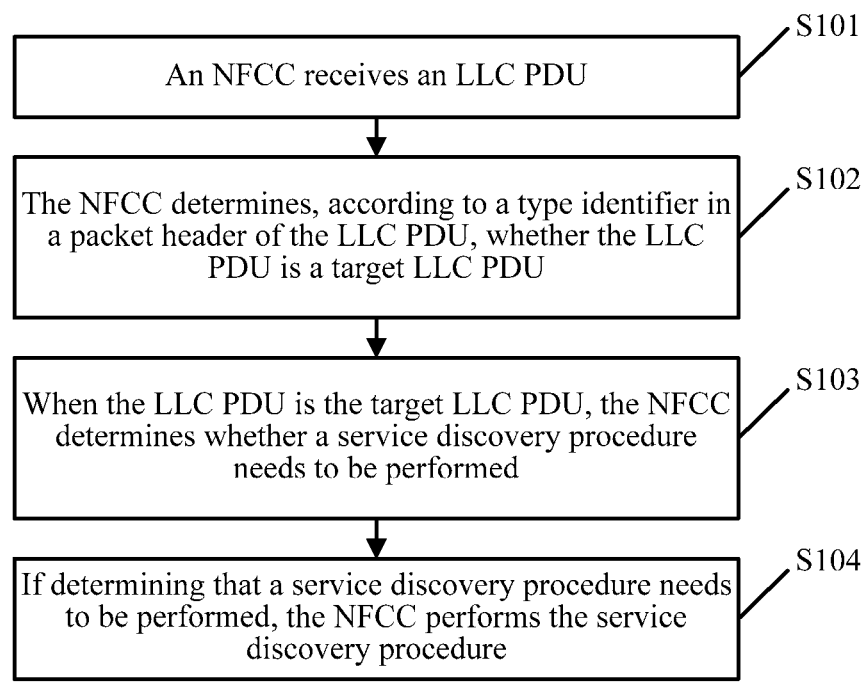
FIG. 1 is a schematic flowchart of a LLCP based service discovery method according to an embodiment of the present invention.

Referring to FIG. 1, FIG. 1 is a schematic flowchart of a Logical Link Control Protocol (LLCP) based service discovery method according to an embodiment of the present invention. The method shown in FIG. 1 is applied to an NFCC of a first NFC device, and the first NFC device further includes a DH. As shown in FIG. 1, the LLCP based service discovery method may include the following steps.

S101: The NFCC receives an LLC PDU.

S102: The NFCC determines, according to a type identifier in a packet header of the LLC PDU, whether the LLC PDU is a target LLC PDU.

In this embodiment of the present invention, when a determining result in step S102 is that the LLC PDU is a target LLC PDU, the NFCC performs step S103. When a determining result in step S102 is that the LLC PDU is not a target LLC PDU and the LLC PDU is a PDU sent by a second NFC device, the NFCC sends the LLC PDU to the DH. Alternatively, when a function corresponding to the LLC PDU can be performed on the NFCC as a radio frequency interface function extension (that is, an RF interface extension defined in the NCI protocol, refer to the NCI protocol for specific content, and details are not described herein) by means of a current activated radio frequency interface (that is, an RF interface defined in the NCI protocol, refer to the NCI protocol for specific content, and details are not described herein), the NFCC directly processes the LLC PDU and makes a reply. When a determining result in step S102 is that the LLC PDU is not a target LLC PDU and the LLC PDU is a PDU sent by the DH, the NFCC sends the LLC PDU to the second NFC device.

It should be noted that, for a point-to-point mode, the radio frequency interface may be a frame radio frequency interface (Frame RF Interface) or an NFC data exchange protocol radio frequency interface (NFC-DEP RF Interface), or may be an LLCP high radio frequency interface (LLCP High RF Interface) that has not been specifically defined in the NCI protocol. That is, the NFCC needs to be responsible for performing most or all functions in the LLCP protocol.

In this embodiment of the present invention, the target LLC PDU may include but is not limited to a first CONNECT PDU sent by the DH or the second NFC device, an SNL PDU sent by the second NFC device, an aggregated frame protocol data unit (AGF PDU) sent by the second NFC device, and the like. That is, the target LLC PDU may be any one of the first CONNECT PDU sent by the DH or the second NFC device, the SNL PDU sent by the second NFC device, or the AGF PDU sent by the second NFC device. The AGF PDU may include a CONNECT PDU and/or an SNL PDU. This is not limited in this embodiment of the present invention.

It should be noted that, the CONNECT PDU is used to request to establish a data link connection on an LLCP link between the two NFC devices to use a connection-oriented service of the two NFC devices.

S103: When the LLC PDU is the target LLC PDU, the NFCC determines whether a service discovery procedure needs to be performed.

In this embodiment of the present invention, when a determining result in step S103 is that a service discovery procedure needs to be performed, the NFCC performs step S104. When a determining result in step S103 is that a service discovery procedure does not need to be performed and the LLC PDU is an LLC PDU sent by the second NFC device, the NFCC sends the LLC PDU to the DH. When a determining result in step S103 is that a service discovery procedure does not need to be performed and the LLC PDU is an LLC PDU sent by the DH, the NFCC sends the LLC PDU to the second NFC device.

S104: If determining that a service discovery procedure needs to be performed, the NFCC performs the service discovery procedure.

In an optional implementation, before performing the service discovery procedure, the NFCC may further perform the following operation:

receiving, by the NFCC, a start command sent by the DH. The start command is used to command the NFCC to start a function of performing a service discovery procedure. A precondition under which the NFCC receives the start command sent by the DH is that the DH determines that the NFCC has a capability of performing a service discovery procedure. A specific manner of determining, by the DH, that the NFCC has a capability of performing a service discovery procedure includes but is not limited to the following two manners: 1. Before determining that a service discovery procedure needs to be performed by the NFCC, the DH actively sends, to the NFCC, a query request for querying whether the NFCC has a capability of performing a service discovery procedure, so that the NFCC responds to the query request and reports capability information to the DH. The capability information is used to indicate that the NFCC has the capability of performing a service discovery procedure. 2. When the NFCC of the first NFC device is initialized, the NFCC reports capability information to the DH. The capability information is used to indicate that the NFCC has the capability of performing a service discovery procedure.

In this embodiment of the present invention, a precondition under which the NFCC receives a start command sent by the DH is that a frame radio frequency interface, an NFC-DEP radio frequency interface, or an LLCP high radio frequency interface has been activated. The receiving, by the NFCC, a start command sent by the DH may be performed before step S101, or may be performed after step S101 and before step S102, or may be performed after a determining result in step S102 is that the LLC PDU is a target LLC PDU and before step S103, or may be performed after a determining result in step S103 is that a service discovery procedure needs to be performed and before step S104. This is not limited in this embodiment of the present invention.

In another optional implementation, before performing the service discovery procedure, the NFCC may further perform the following operation:

determining, by the NFCC, that the NFCC has a capability of performing a service discovery procedure.

In this embodiment of the present invention, the determining, by the NFCC, that the NFCC has a capability of performing a service discovery procedure may be performed before step 101, or may be performed after step S101 and before step S102, or may be performed after a determining result in step S102 is that the LLC PDU is a target LLC PDU and before step S103, or may be performed after a determining result in step S103 is that a service discovery procedure needs to be performed and before step S104. This is not limited in this embodiment of the present invention.

In this embodiment of the present invention, when the NFCC determines that the NFCC has a capability of performing a service discovery procedure, after the NFCC performs the service discovery procedure, the NFCC may activate the LLCP high radio frequency interface and send a report to the DH.

In an optional implementation, before performing step S101, the NFCC may further perform the following operation:

reporting, by the NFCC, capability information to the DH, where the capability information is used to indicate that the NFCC has a capability of performing a service discovery procedure.

In this embodiment of the present invention, the NFCC may report capability information to the DH by means of an initialization response CORE_INIT_RSP (refer to the NCI protocol for complete field components of CORE_MIT_RSP, and details are not described herein). That is, for the NFC-DEP radio frequency interface, the frame radio frequency interface, or even the LLCP high radio frequency interface, when a radio frequency interface extension corresponding to the radio frequency interface is reported to the DH by means of CORE_MIT_RSP, a radio frequency interface extension (such as a Logical Link Control Protocol service discovery procedure radio frequency interface extension (LLCP SDP RF Interface Extension)) required in this embodiment of the present invention may be used as one in an extension list (such as some related fields in CORE_MIT_RSP shown in Table 1) in CORE_MIT_RSP and reported to the DH.

TABLE 1

CORE_INIT_RSP
Initialization response CORE_INIT_RSP

| Field | Length | Meaning |
|---|---|---|
| ... | ... | ... |
| ... | ... | ... |
| Quantity N of radio frequency interfaces supported by the NFCC | 1 byte | A value n of the byte indicates a quantity of radio frequency interfaces supported by the NFCC. |
| The n$^{th}$ (n = 1, 2, ...) | (x + 2) bytes | Radio frequency interface | 1 byte | A value of the byte indicates a radio frequency interface |

TABLE 1-continued

CORE_INIT_RSP
Initialization response CORE_INIT_RSP

| Field | Length | Meaning |
|---|---|---|
| supported radio frequency interface | | supported by the NFCC. Refer to Table 131 in the NCI protocol for specific content. |
| Quantity of radio frequency interface extensions | 1 byte | A value of the byte indicates a quantity of radio frequency interface extensions supported by the radio frequency interface |
| Radio frequency interface extension list [0, ..., x] | x bytes | A list of radio frequency interface extensions supported by the radio frequency interface. Refer to Table 132 defined in the NCI protocol for specific content. |
| ... | ... | ... |

The radio frequency interface extension list [0, ..., x] indicates a radio frequency interface extension supported by the NFCC when a radio frequency interface is activated. A type of the radio frequency interface extension is shown in the following Table 2. Table 2 is Table 132 defined in the NCI protocol.

TABLE 2

Radio frequency interface extension

| Value | Type |
|---|---|
| 0 × 00 | Frame aggregation radio frequency interface extension |
| 0 × 01 | LLCP heartbeat maintaining radio frequency interface extension |
| 0 × 02 | LLCP service discovery procedure radio frequency interface extension |
| 0 × 03 to 0 × 7F | Reserved |
| 0 × 80 to 0 × FE | Dedicated |
| 0 × FF | Reserved |

In this embodiment of the present invention, after receiving an LLC PDU, an NFCC determines, according to a type identifier in a packet header of the LLC PDU, whether the LLC PDU is a target LLC PDU. The target LLC PDU includes a CONNECT PDU sent by a DH or a second NFC device, an SNL PDU sent by the second NFC device, or an AGF PDU sent by the second NFC device. When the LLC PDU is the target LLC PDU, the NFCC determines whether a service discovery procedure needs to be performed. If the service discovery procedure needs to be performed, the NFCC performs the service discovery procedure. It can be learned that, in this embodiment of the present invention, the NFCC can perform the service discovery procedure, thereby reducing interactions between the NFCC and the DH, reducing resource overheads, and improving communication efficiency. In addition, the NFCC can perform some functions of the DH, such as the service discovery procedure, which conforms to a trend that a logical interface between the DH and the NFCC develops towards upper layers in a point-to-point mode.

Figure 2:
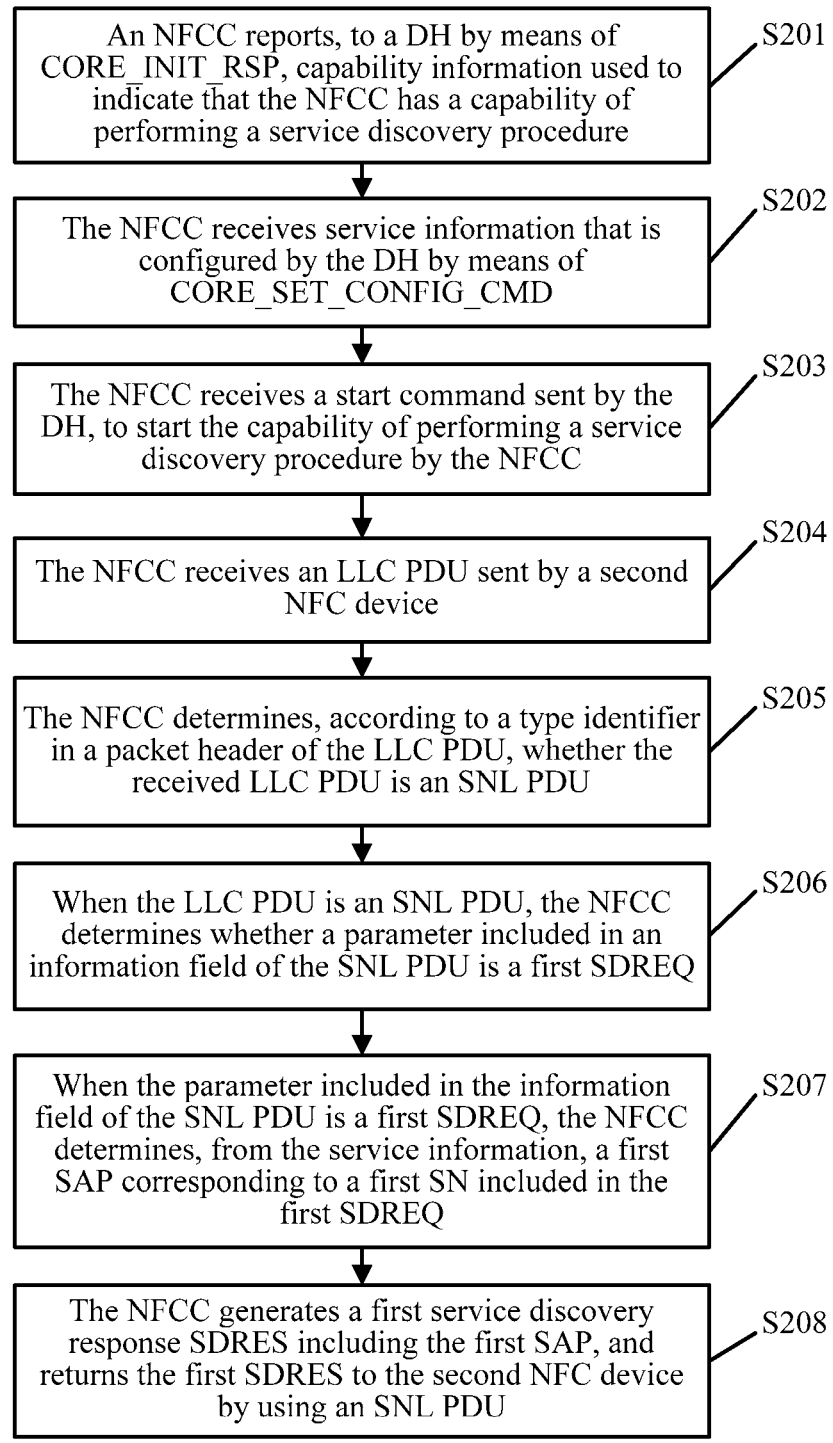
FIG. 2 is a schematic flowchart of another LLCP based service discovery method according to an embodiment of the present invention.

Referring to FIG. 2, FIG. 2 is a schematic flowchart of another Logical Link Control Protocol (LLCP) based service discovery method according to an embodiment of the present invention. The schematic flowchart shown in FIG. 2 is a schematic flowchart of a LLCP based service discovery method when an LLC PDU received by an NFCC is an SNL PDU sent by a second NFC device. The NFCC in FIG. 2 is an NFCC of a first NFC device, and a DH in FIG. 2 is a DH of the first NFC device. As shown in FIG. 2, the LLCP based service discovery method may include the following steps.

S201: The NFCC reports, to the DH by means of CORE_MIT_RSP, capability information used to indicate that the NFCC has a capability of performing a service discovery procedure.

In this embodiment of the present invention, a specific manner of reporting capability information by the NFCC is described in the foregoing embodiment, and details are not described herein again. In this embodiment of the present invention, this manner is merely used as an example for description. Certainly, other reporting manners described in the foregoing embodiment may be used.

S202: The NFCC receives service information that is configured by the DH by means of CORE_SET_CONFIG_CMD.

In this embodiment of the present invention, the service information may include at least one SN, or may include at least one SN and an SAP corresponding to each SN, or may include one or more SNs and an SAP corresponding to each of some SNs of the one or more SNs. This is not limited in this embodiment of the present invention. When the service information includes at least one SN, after receiving the service information, the NFCC allocates an SAP corresponding to each SN in the service information.

In this embodiment of the present invention, after receiving the capability information, the DH may configure service information for the NFCC by using a configuration parameter command. The configuration parameter command may be CORE_SET_CONFIG_CMD defined in the NCI protocol, or may be a command that is specially used to configure the service information, such as CORE_CONFIG_LLCP_SDP_CMD. This is not limited in this embodiment of the present invention. When the configuration parameter command is CORE_SET_CONFIG_CMD and the service information includes at least one SN and an SAP corresponding to each SN, the configuration parameter command may be shown in Table 3:

TABLE 3

| CORE_SET_CONFIG_CMD Configuration parameter command CORE_SET_CONFIG_CMD | | | |
|---|---|---|---|
| Field | Length | | Meaning |
| Parameter quantity | 1 byte | | A value n of the field indicates a quantity of parameter fields below. |
| Parameter [1, . . ., n] | (m + 2) bytes | Indentifier ID  1 byte | Refer to Table 134 for identifiers of configuration parameters. |
| | | Length Len  1 byte | If a length of a value of a configuration parameter is 0, a value field below may be ignored, and the NFCC needs to use a default value of the configuration parameter. |

TABLE 3-continued

| CORE_SET_CONFIG_CMD Configuration parameter command CORE_SET_CONFIG_CMD | | | |
|---|---|---|---|
| Field | Length | | Meaning |
| | Value Val | m bytes | Value of the configuration parameter |

Table 3 is Table 11 in the NCI protocol. In this embodiment, the parameter used to configure service information may be an LLCP service discovery procedure operation parameter LLCP_SDP_OP, as shown in Table 4:

TABLE 4

| Configuration parameter | |
|---|---|
| Parameter name | Identifier value |
| Other parameters | |
| LLCP_SDP_OP | 0x84 |

Table 4 is Table 134 in the NCI protocol. In the NCI protocol, the parameter LLCP_SDP_OP may be configured as a parameter required when the NFCC performs the service discovery procedure by using the NFC-DEP radio frequency interface, and certainly, may be configured as a parameter required when the NFCC performs the service discovery procedure by using another radio frequency interface (such as the frame radio frequency interface or the LLCP high radio frequency interface). When the parameter LLCP_SDP_OP is configured according to Table 3, specific parameters included in a value (Val) field corresponding to the parameter (that is, content and a length of the content that are included in the service information) may be shown in Table 5:

TABLE 5

| LLCP service discovery procedure operation parameter LLCP_SDP_OP | | |
|---|---|---|
| Field | Length | Meaning |
| Service List [n] | 1 byte | Quantity of SN-SAP pairs |
| SN | y bytes | Service name registered by the first NFC device for a service |
| SAP | 1 byte | Service access point address bound by the first NFC device for a service corresponding to the SN |

S203: The NFCC receives a start command sent by the DH, to start the capability of performing a service discovery procedure by the NFCC.

In this embodiment of the present invention, the start command sent to the DH by the NFCC may be RF_INTF_EXT_START_CMD (shown in the following Table 6) defined in the NCI protocol. An Extension field included in the start command may be an LLCP service discovery procedure radio frequency interface extension identifier LLCP SDP RF IF Ext. A start parameter may be blank.

S204: The NFCC receives an LLC PDU sent by the second NFC device.

S205: The NFCC determines, according to a type identifier in a packet header of the LLC PDU, whether the received LLC PDU is an SNL PDU.

In this embodiment of the present invention, when a determining result in step S205 is that the received LLC PDU is an SNL PDU, the NFCC performs step S206. When a determining result in step S205 is that the received LLC PDU is not an SNL PDU, the NFCC determines whether the LLC PDU is a CONNECT PDU or an AGF PDU that includes at least one SNL PDU and/or at least one CONNECT PDU. If the LLC PDU is a CONNECT PDU or an AGF PDU that includes at least one SNL PDU and/or at least one CONNECT PDU, the NFCC performs a corresponding operation. If the LLC PDU is not a CONNECT PDU or an AGF PDU that includes at least one SNL PDU and/or at least one CONNECT PDU, the NFCC determines whether a function corresponding to the LLC PDU can be performed on the NFCC as a radio frequency interface function extension (that is, an RF interface extension defined in the NCI protocol, refer to the NCI protocol for specific content, and details are not described herein) by means of a current activated radio frequency interface (that is, an RF interface defined in the NCI protocol, refer to the NCI protocol for specific content, and details are not described herein). If the function corresponding to the LLC PDU can be performed on the NFCC as a radio frequency interface function extension by means of a current activated radio frequency interface, the NFCC directly processes the LLC PDU and makes a reply. If the function corresponding to the LLC PDU cannot be performed on the NFCC as a radio frequency interface function extension by means of a current activated radio frequency interface, the NFCC directly forwards the LLC PDU to the DH.

It should be noted that, this step may further include the following situation: If determining, according to the type identifier in the packet header of the LLC PDU, that the LLC PDU is an AGF PDU, the NFCC may determine, by parsing at least one LLC PDU carried in an information field in the AGF PDU, whether there is an SNL PDU in the AGF PDU.

S206: When the LLC PDU is an SNL PDU, the NFCC determines whether a parameter included in an information field of the SNL PDU is a first SDREQ.

In this embodiment of the present invention, when a value of a type parameter type in the information field of the SNL PDU is 08h, the NFCC may determine that the parameter included in the information field of the SNL PDU is the first SDREQ.

In this embodiment of the present invention, when a determining result in step S206 is that the parameter included in the information field of the SNL PDU is a first SDREQ, the NFCC performs step S207. When a determining result in step S206 is that the parameter included in the information field of the SNL PDU is not a first SDREQ, the NFCC forwards the SNL PDU to the DH, so that the DH processes the SNL PDU and makes a reply.

S207: When the parameter included in the information field of the SNL PDU is a first SDREQ, the NFCC determines, from the service information, a first SAP corresponding to a first SN included in the first SDREQ.

S208: The NFCC generates a first service discovery response (SDRES) including the first SAP, and returns the first SDRES to the second NFC device by using an SNL PDU.

In this embodiment of the present invention, in step S207, if the NFCC fails to find a first SAP corresponding to the first SN by querying the service information, the NFCC does not make a reply, or directly generates reply information including an error indication and returns the reply information to the second NFC device, or sends a report to the DH after allocating a corresponding first SAP to the first SN and replies to the second NFC device by using an SDRES including the first SAP.

In an optional implementation, step S202 and step S203 may be combined into one step. That is, after reporting, to the DH, capability information used to indicate that the NFCC has a capability of performing a service discovery procedure, the NFCC receives RF_INTF_EXT_START_CMD sent by the DH, to start the capability of performing a service discovery procedure by the NFCC. A start parameter of RF_INTF_EXT_START_CMD may include the service information. In this case, RF_INTF_EXT_START_CMD may be shown in Table 6:

TABLE 6

RF_INTF_EXT_START_CMD
Start command RF_INTF_EXT_START_CMD

| Field | Length | Value and meaning | | |
|---|---|---|---|---|
| Radio frequency interface extension | (x + 2) bytes | Radio frequency interface extension identifier | 1 byte | Refer to Table 132 defined in the NCI protocol for details. |
| | | Length of the start parameter | 1 byte | A value x of the field indicates a length of a start parameter field below |
| | | Start parameter | x bytes | Parameters required when the NFCC performs a function corresponding to the radio frequency interface extension |

An extension of the start parameter in RF_INTF_EXT_START_CMD may be shown in Table 7:

TABLE 7

Start parameters corresponding to LLCP service discovery radio frequency interface extensions

| Field | Length | Meaning |
|---|---|---|
| Service List [n] | 1 byte | Quantity of SN-SAP pairs |
| SN | y bytes | Service name registered by the first NFC device for a service |
| SAP | 1 byte | Service access point address bound by the first NFC device for a service corresponding to the SN |

In this embodiment of the present invention, step S206 is a step of determining, by the NFCC, whether a service discovery procedure needs to be performed, and step S207 and step S208 are steps of performing the service discovery procedure by the NFCC.

In this embodiment of the present invention, step 203 is described by using an example in which the DH sends a start command to the NFCC after a radio frequency interface (such as the NFC-DEP radio frequency interface, the frame radio frequency interface, or the LLCP high radio frequency interface) is activated. In addition, in this embodiment of the present invention, alternatively, the NFCC may need to perform the service discovery procedure before a radio frequency interface (such as the LLCP high radio frequency interface) is activated. In this case, the NFCC needs to determine, at any time before performing the service discovery procedure, that the NFCC has a capability of performing a service discovery procedure. Details are not described.

It should be noted that, the NCI protocol in this embodiment of the present invention is the draft 9 of the existing NCI 2.0 version. The NCI protocol in the following embodiments is also the protocol version, and details are not described again subsequently.

In this embodiment of the present invention, interactions between an NFCC and a DH are reduced. That is, the NFCC performs a service discovery procedure, and therefore, does not need to interact with the DH, thereby reducing resource overheads of the DH. In addition, when performing the service discovery procedure, the NFCC needs to have a capability of parsing an LLC PDU, but the NFCC only needs to first parse a packet header of an LLC PDU, and then parse a particular LLC PDU, such as an SNL PDU including an SN, and does not need to parse information fields of all LLC PDUs (currently, there are 14 types of LLC PDUs) specified in the LLCP. Therefore, overheads of the NFCC caused by parsing the particular LLC PDU by the NFCC are relatively small, and RF communication is not affected. In addition, in this embodiment of the present invention, the NFCC can perform some functions of the DH, such as the service discovery procedure, which conforms to a trend that a logical interface between the DH and the NFCC develops towards upper layers in a point-to-point mode. In addition, in this embodiment, before the DH and the NFCC transmit upper-layer information, even if the DH is in a standby state, the NFCC can still complete the service discovery procedure, thereby preparing for subsequent exchanges of upper-layer information.

Figure 3:
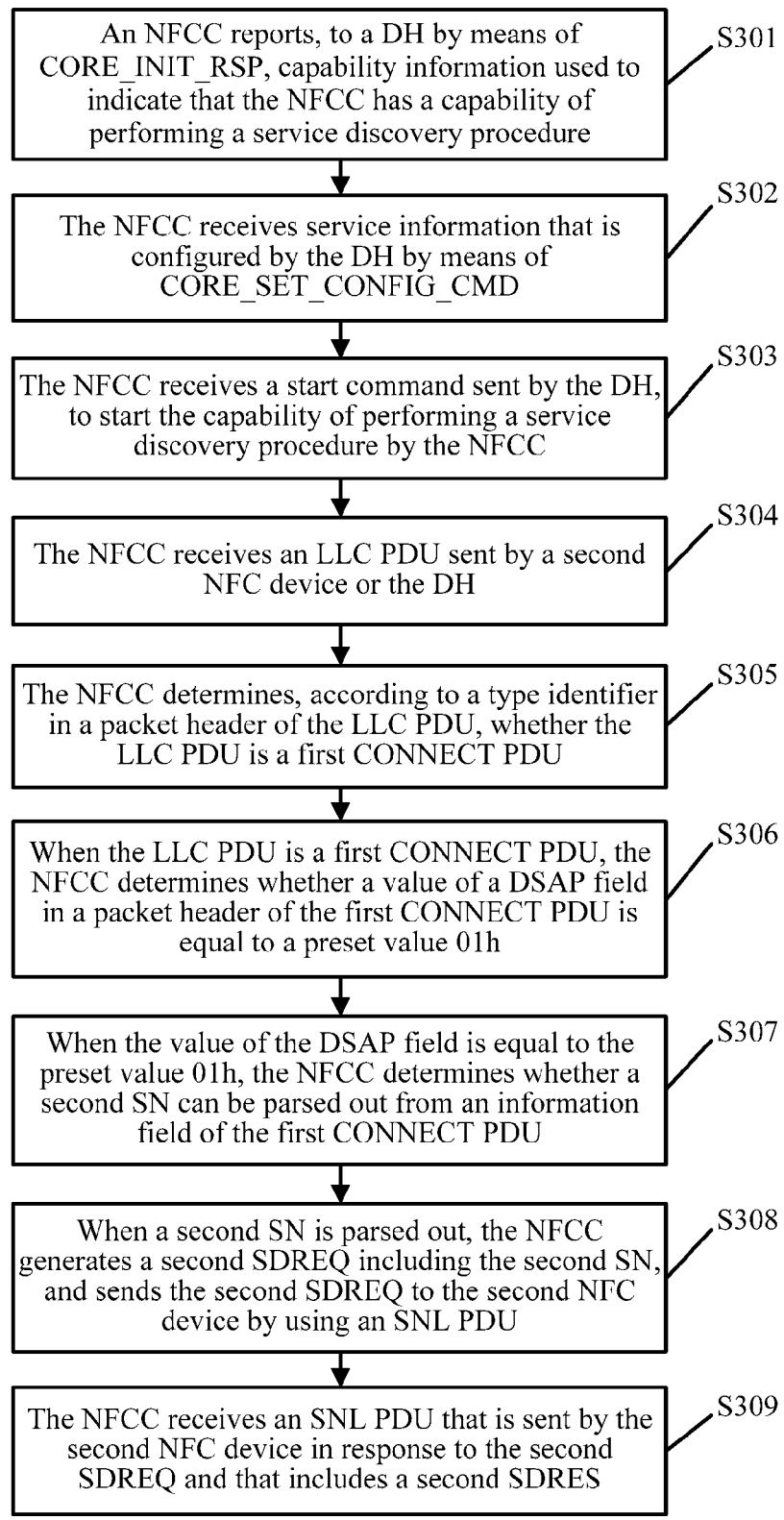
FIG. 3 is a schematic flowchart of still another LLCP based service discovery method according to an embodiment of the present invention.

Referring to FIG. 3, FIG. 3 is a schematic flowchart of still another Logical Link Control Protocol (LLCP) based service discovery method according to an embodiment of the present invention. The schematic flowchart shown in FIG. 3 is a schematic flowchart of a LLCP based service discovery method when an LLC PDU received by an NFCC is a first CONNECT PDU sent by a second NFC device or a DH. The NFCC in FIG. 3 is an NFCC of a first NFC device, and the DH in FIG. 3 is a DH of the first NFC device. As shown in FIG. 3, the LLCP based service discovery method may include the following steps.

S301: The NFCC reports, to the DH by means of CORE_INIT_RSP, capability information used to indicate that the NFCC has a capability of performing a service discovery procedure.

In this embodiment of the present invention, a specific manner of reporting capability information by the NFCC is described in the embodiment, and details are not described herein again. In this embodiment of the present invention, this manner is merely used as an example for description. Certainly, other reporting manners described in the foregoing embodiment may be used.

S302: The NFCC receives service information that is configured by the DH by means of CORE_SET_CONFIG_CMD.

In this embodiment of the present invention, a manner under which the NFCC receives service information sent by the DH is the same as that described in the foregoing embodiment, and details are not described herein again.

S303: The NFCC receives a start command sent by the DH, to start the capability of performing a service discovery procedure by the NFCC.

In this embodiment of the present invention, a manner under which the NFCC receives a start command sent by the DH is the same as that described in the foregoing embodiment, and details are not described herein again.

S304: The NFCC receives an LLC PDU sent by the second NFC device or the DH.

S305: The NFCC determines, according to a type identifier in a packet header of the LLC PDU, whether the LLC PDU is a first CONNECT PDU.

In this embodiment of the present invention, when a determining result in step S305 is that the LLC PDU is a first CONNECT PDU, the NFCC performs step S306. When a determining result in step S305 is that the LLC PDU is not a first CONNECT PDU, the NFCC determines whether the LLC PDU is an SNL PDU sent by the second device or an AGF PDU sent by the second device. If the LLC PDU is an SNL PDU sent by the second device or an AGF PDU sent by the second device, the NFCC performs a corresponding operation. For example, when the LLC PDU is an SNL PDU sent by the second device, the NFCC performs operations corresponding to step S206 to step S208 that are shown in FIG. 2. If the LLC PDU is not an SNL PDU sent by the second device or an AGF PDU sent by the second device, the NFCC determines whether a function corresponding to the LLC PDU can be performed on the NFCC as a radio frequency interface function extension by means of a current activated radio frequency interface (that is, an RF interface defined in the NCI protocol, refer to the NCI protocol for specific content, and details are not described herein). If the function corresponding to the LLC PDU can be performed on the NFCC as a radio frequency interface function extension by means of a current activated radio frequency interface, the NFCC directly processes the LLC PDU and makes a reply. If the function corresponding to the LLC PDU cannot be performed on the NFCC as a radio frequency interface function extension by means of a current activated radio frequency interface, when the LLC PDU is a PDU sent by the second NFC device, the NFCC directly forwards the LLC PDU to the DH. When the LLC PDU is a PDU sent by the DH, the NFCC directly sends the LLC PDU to the second NFC device.

S306: When the LLC PDU is a first CONNECT PDU, the NFCC determines whether a value of a DSAP field in a packet header of the first CONNECT PDU is equal to a preset value 01h.

In this embodiment of the present invention, when a determining result in step S306 is that the value of the DSAP field in the packet header of the first CONNECT PDU is equal to the preset value 01h, the NFCC performs step S307. When a determining result in step S306 is that the value of the DSAP field in the packet header of the first CONNECT PDU is not equal to the preset value 01h and the first CONNECT PDU is a PDU sent by the second NFC device, the NFCC determines that a function corresponding to the first CONNECT PDU can be performed on the NFCC as a radio frequency interface function extension by means of a current activated radio frequency interface (that is, an RF interface defined in the NCI protocol, refer to the NCI protocol for specific content, and details are not described herein). If the function corresponding to the first CONNECT PDU can be performed on the NFCC as a radio frequency interface function extension by means of a current activated radio frequency interface, the NFCC directly processes the LLC PDU and makes a reply. If the function corresponding to the first CONNECT PDU cannot be performed on the NFCC as a radio frequency interface function extension by means of a current activated radio frequency interface, the NFCC directly forwards the LLC PDU to the DH. When a determining result in step S306 is that the value of the DSAP field in the packet header of the first CONNECT PDU is not equal to the preset value 01h and the first CONNECT PDU is a PDU sent by the DH, the NFCC directly sends the first CONNECT PDU to the second NFC device.

S307: When the value of the DSAP field is equal to the preset value 01h, the NFCC determines whether a second SN can be parsed out from an information field of the first CONNECT PDU.

In this embodiment of the present invention, when a determining result in step S307 is that a second SN can be parsed out from the information field of the first CONNECT PDU, the NFCC performs step S308. When a determining result in step S307 is that a second SN cannot be parsed out from the information field of the first CONNECT PDU and the first CONNECT PDU is a PDU sent by the second NFC device, the NFCC does not make a reply to the first CONNECT PDU, or directly generates reply information including an error indication and returns the reply information to the second NFC device. When a determining result in step S306 is that a second SN cannot be parsed out from the information field of the first CONNECT PDU and the first CONNECT PDU is a PDU sent by the DH, the NFCC does not make a reply to the first CONNECT PDU, or directly generates reply information including an error indication and returns the reply information to the DH.

S308: When a second SN is parsed out, the NFCC generates a second SDREQ including the second SN, and sends the second SDREQ to the second NFC device by using an SNL PDU.

S309: The NFCC receives an SNL PDU that is sent by the second NFC device in response to the second SDREQ and that includes a second SDRES.

In this embodiment of the present invention, the second SDRES includes a second SAP. The second SAP may be an SAP that is allocated by an NFCC of the second NFC device to the second SN, or may be an SAP that is found by the NFCC of the second NFC device by querying service information stored in the NFCC and that corresponds to the second SN. This is not limited in this embodiment of the present invention.

In this embodiment of the present invention, step S306 and step S307 are steps of determining, by the NFCC, whether a service discovery procedure needs to be performed, and step S308 and step S309 are steps of performing the service discovery procedure by the NFCC.

In an optional implementation, when the first CONNECT PDU is a PDU sent by the DH, after performing step S309, the NFCC may further perform the following operation:

generating, by the NFCC, a second CONNECT PDU, and sending the second CONNECT PDU to the second NFC device. A DSAP in the second CONNECT PDU is the second SAP in the second SDRES. When a value of a source service access point (SSAP) field in the packet header of the first CONNECT PDU is an invalid value (such as 00h or 01h), an SSAP in the second CONNECT PDU is a third SAP that is found by the NFCC by querying the service information and that corresponds to the second SN. When a value of the SSAP field in the packet header of the first CONNECT PDU is a valid value, the SSAP in the second CONNECT PDU is an SSAP in the packet header of the first CONNECT PDU.

In this embodiment of the present invention, for step S306 and step S307, after determining that the received LLC PDU is the CONNECT PDU sent by the DH, the NFCC may further determine whether a DSAP in a packet header of the CONNECT PDU is 01h and whether an SSAP is a valid value (that is, another value other than 00h and 01h). If the DSAP in the packet header of the CONNECT PDU is 01h and the SSAP is a valid value, the NFCC may directly send the CONNECT PDU to the second NFC device at a peer end, or may first determine whether an SN in an information field of the CONNECT PDU and the SSAP in the packet header of the CONNECT PDU are a pair of service information stored in the NFCC. If the SN in the information field of the CONNECT PDU and the SSAP in the packet header of the CONNECT PDU are a pair of service information stored in the NFCC, the NFCC sends the CONNECT PDU to the second NFC device at the peer end. If the SN in the information field of the CONNECT PDU and the SSAP in the packet header of the CONNECT PDU are not a pair of service information stored in the NFCC, the NFCC performs the service discovery procedure in step S308 and step S309 and the foregoing operation of regenerating a CONNECT PDU. If the DSAP in the packet header of the CONNECT PDU is 01h and the SSAP is an invalid value (such as 00h or 01h), the NFCC may directly send the CONNECT PDU to the second NFC device, or may perform the service discovery procedure in step S308 and step S309 and the foregoing operation of regenerating a CONNECT PDU, or may find an SAP corresponding to an SN or allocate a corresponding SAP to the SN after parsing out the SN in the information field of the CONNECT PDU, and then perform the foregoing operation of regenerating a CONNECT PDU. If the DSAP in the packet header of the CONNECT PDU is another value other than 00h and 01h, the NFCC directly sends the CONNECT PDU to the second NFC device at the peer end.

In another optional implementation, when the first CONNECT PDU is a PDU sent by the DH, after performing step S309, the NFCC may further perform the following operation:

reporting, by the NFCC to the DH, a result of performing the service discovery procedure by the NFCC (that is, the second SAP in the second SDRES) and a request message used to regenerate a CONNECT PDU; receiving a CONNECT PDU regenerated by the DH; and sending the regenerated CONNECT PDU to the second NFC device. A DSAP in the regenerated CONNECT PDU is the second SAP in the second SDRES.

In an optional implementation, when the first CONNECT PDU is a PDU sent by the second NFC device, after performing step S309, the NFCC may further perform the following operations:

generating, by the NFCC, a connect complete protocol data unit (CC PDU), and sending the CC PDU to the second NFC device, where an SSAP in the CC PDU is a fourth SAP that is in the service information and that corresponds to the second SN, a DSAP in the CC PDU is the second SAP is the second SDRES, and the CC PDU is used to indicate that a data link connection between the first NFC device and the second NFC device is successfully established; and sending, by the NFCC to the DH, indication information corresponding to the first CONNECT PDU and indication information used to indicate that the data link connection is successfully established. The indication information corresponding to the first CONNECT PDU may include but is not limited to the second SAP, or the second SAP and a PDU type of the first CONNECT PDU. The PDU type of the first CONNECT PDU is used to indicate that the second NFC device requests to establish a data link connection to the first NFC device.

In this embodiment of the present invention, for step S306 and step S307, after determining that the received LLC PDU is the CONNECT PDU sent by the second NFC device at the peer end, the NFCC may further determine whether a DSAP in a packet header of the CONNECT PDU is 01h and whether an SSAP is a valid value (that is, another value other than 00h and 01h). If the DSAP in the packet header of the CONNECT PDU is 01h and the SSAP is a valid value, the NFCC may directly perform step S307 to step S309, or may find an SAP corresponding to an SN or allocate a corresponding SAP to the SN after parsing out the SN from an information field of the CONNECT PDU, and then directly forward the CONNECT PDU to the DH. If the DSAP is 01h and the SSAP is an invalid value, the NFCC may directly perform step S307 to step S309 and the operation of generating a CC PDU and making a reply. If the DSAP is another value other than 00h and 01h and the SSAP is a valid value, the NFCC may directly forward the CONNECT PDU to the DH. If the DSAP is another value other than 00h and 01h and the SSAP is an invalid value, after finding an SN corresponding to the DSAP by querying the service information stored in the NFCC, the NFCC may perform step S308 and step S309 and the foregoing operation of generating a CC PDU and making a reply.

In another optional implementation, when the first CONNECT PDU is a PDU sent by the second NFC device, after performing step S309, the NFCC may further perform the following operation:

reporting, by the NFCC to the DH, a result of performing the service discovery procedure by the NFCC and indication information corresponding to the first CONNECT PDU, and waiting for a CC PDU generated by the DH. The indication information corresponding to the first CONNECT PDU may include but is not limited to the second SAP, or the second SAP and a PDU type of the first CONNECT PDU. The PDU type of the first CONNECT PDU is used to indicate that the second NFC device requests to establish a data link connection to the first NFC device.

Certainly, the indication information corresponding to the first CONNECT PDU may be the first CONNECT PDU. This is not limited in the present invention.

In this embodiment of the present invention, when the LLC PDU is an AGF PDU sent by the second NFC device, the NFCC parses out each LLC PDU in an information field of the AGF PDU, and then performs the operations corresponding to step S206 to step S208 in FIG. 2 on each SNL PDU that is parsed out, and performs the operations corresponding to step S306 to step S309 in FIG. 3 on each CONNECT PDU that is parsed out. In addition, the NFCC may parse an AGF PDU sent by the DH. If the parsed AGF PDU includes a CONNECT PDU, the NFCC may also perform the operations corresponding to step S306 to step S309 in FIG. 3 on each CONNECT PDU that is parsed out.

In this embodiment of the present invention, interactions between an NFCC and a DH are reduced. That is, the NFCC performs a service discovery procedure, and therefore, does not need to interact with the DH, thereby reducing resource overheads of the DH. In addition, when performing the service discovery procedure, the NFCC needs to have a capability of parsing an LLC PDU, but the NFCC only needs to first parse a packet header of an LLC PDU, and then parse a particular LLC PDU, such as a CONNECT PDU including an SN, and does not need to parse information fields of all LLC PDUs (currently, there are 14 types of LLC PDUs) specified in the LLCP. Therefore, overheads of the NFCC caused by parsing the particular LLC PDU by the NFCC are relatively small, and RF communication is not affected. In addition, in this embodiment of the present invention, the NFCC can perform some functions of the DH, such as the service discovery procedure, which conforms to a trend that a logical interface between the DH and the NFCC develops towards upper layers in a point-to-point mode. In addition, in this embodiment, before the DH and the NFCC transmit upper-layer information, even if the DH is in a standby state, the NFCC can still complete the service discovery procedure, thereby preparing for subsequent exchanges of upper-layer information.

Figure 4A:
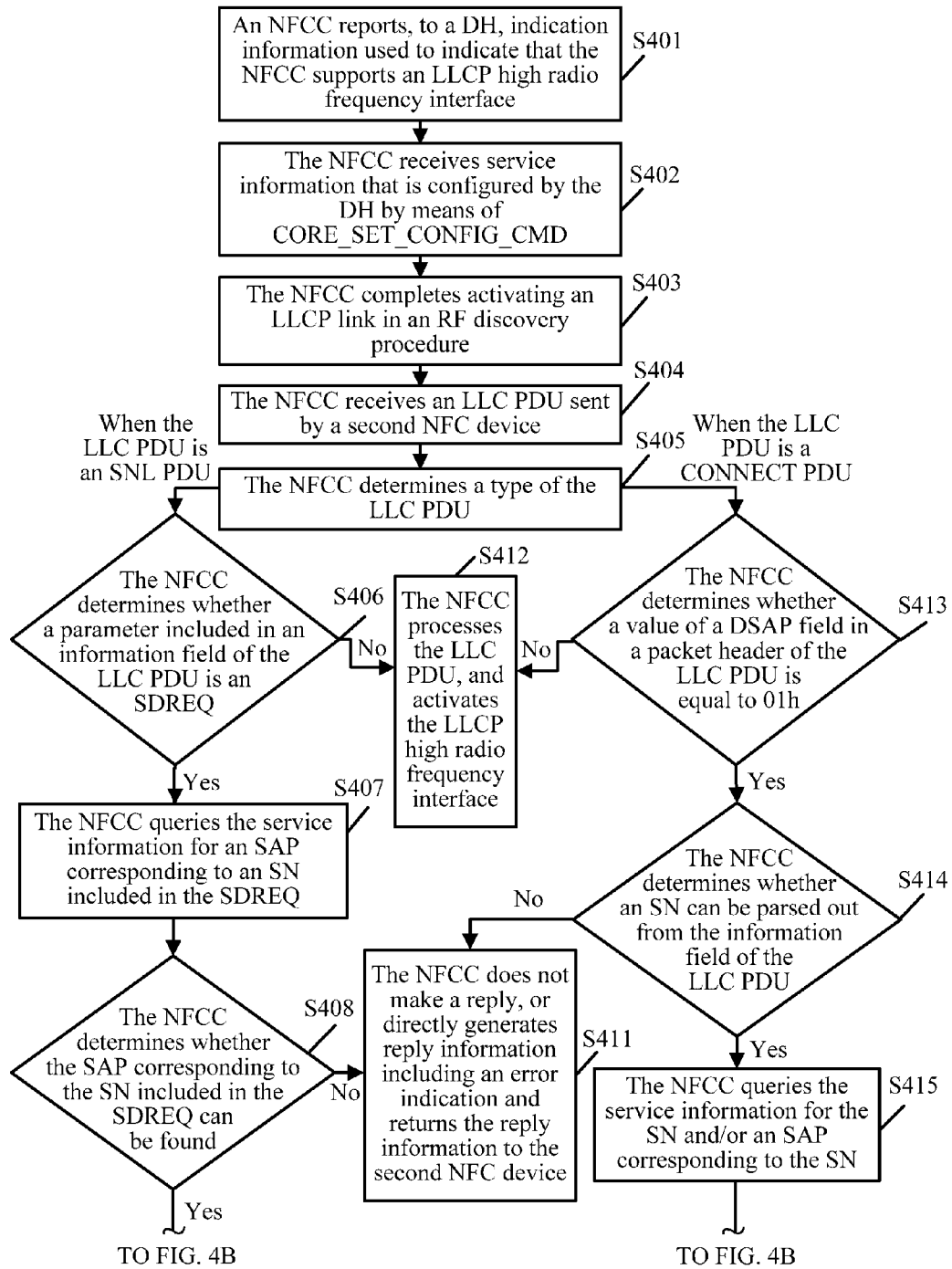
FIG. 4A and FIG. 4B are a schematic flowchart of still another LLCP based service discovery method according to an embodiment of the present invention.
Figure 4B:
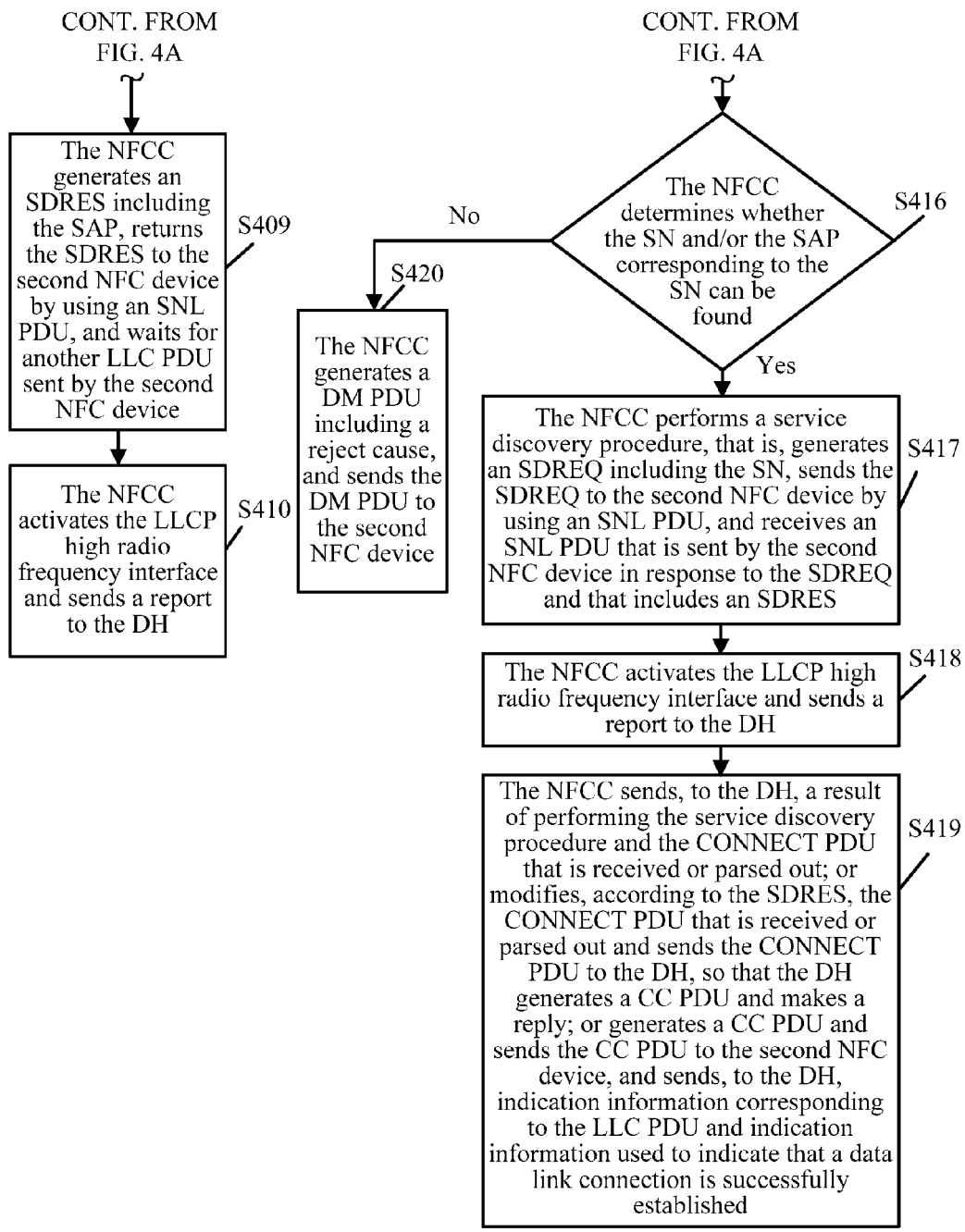

Referring to FIG. 4A and FIG. 4B, FIG. 4A and FIG. 4B are a schematic flowchart of still another LLCP based service discovery method according to an embodiment of the present invention. The schematic flowchart shown in FIG. 4A and FIG. 4B is a schematic flowchart of the LLCP based service discovery method performed by an NFCC before activating a radio frequency interface (such as an LLCP high radio frequency interface). The NFCC in FIG. 4A and FIG. 4B is an NFCC of a first NFC device, and a DH in FIG. 4A and FIG. 4B is a DH of the first NFC device. As shown in FIG. 4A and FIG. 4B, the LLCP based service discovery method may include the following steps.

S401: The NFCC reports, to the DH, indication information used to indicate that the NFCC supports an LLCP high radio frequency interface.

In this embodiment of the present invention, the NFCC may report, to the DH by means of Table 1 in the foregoing embodiment, the indication information indicating that the NFCC supports the LLCP high radio frequency interface. For example, a value of a radio frequency interface that occupies one byte in the $n^{th}$ (n=1, 2, . . . ) supported radio frequency interface field in Table 1 is used to represent the indication information. When the value is 0x04, it indicates that the NFCC supports the LLCP high radio frequency interface, as shown in the following Table 8:

TABLE 8

| Radio frequency interfaces (RF Interfaces) | |
| --- | --- |
| Value of radio frequency interface | Meaning |
| . . . | . . . |
| 0 × 04 | LLCP high radio frequency interface (LLCP High RF Interface) |
| . . . | . . . |

Table 8 is Table 131 in the NCI protocol. 0x04 in this embodiment of the present invention and the corresponding LLCP high radio frequency interface are newly added content in Table 131 in the NCI protocol.

S402: The NFCC receives service information that is configured by the DH by means of CORE_SET_CONFIG_CMD.

In this embodiment of the present invention, a manner under which the NFCC receives service information sent by the DH is the same as that described in the foregoing embodiment, and details are not described herein again.

S403: The NFCC completes activating an LLCP link in an RF discovery procedure.

In this embodiment of the present invention, refer to the LLCP protocol defined by the NFC Forum for a specific process of activating the LLCP link, and details are not described herein.

S404: The NFCC receives an LLC PDU sent by a second NFC device.

S405: The NFCC determines a type of the LLC PDU.

In this embodiment of the present invention, in a manner that is the same as that in the foregoing embodiment, the NFCC may determine a type of the LLC PDU according to a type identifier PTYPE in a packet header of the LLC PDU. When the LLC PDU is an SNL PDU, the NFCC performs step S406. When the LLC PDU is a CONNECT PDU, the NFCC performs step S413. When the LLC PDU is an AGF PDU including at least one SNL PDU and/or at least one CONNECT PDU, the NFCC first parses out each LLC PDU in an information field of the AGF PDU. When an LLC PDU that is parsed out is an SNL PDU, the NFCC performs step S406. When an LLC PDU that is parsed out is a CONNECT PDU, the NFCC performs step S413. In addition, when the LLC PDU is a PDU of any other type, the NFCC may perform step S412 (which is not shown in FIG. 4A and FIG. 4B).

S406: The NFCC determines whether a parameter included in an information field of the LLC PDU is an SDREQ.

In this embodiment of the present invention, when a determining result in step S406 is that the parameter included in the information field of the LLC PDU is an SDREQ, the NFCC performs step S407. When a determining result in step S406 is that the parameter included in the information field of the LLC PDU is not an SDREQ, the NFCC performs step S412.

S407: The NFCC queries the service information for an SAP corresponding to an SN included in the SDREQ.

In this embodiment of the present invention, a manner of obtaining the service information is the same as that in the foregoing embodiment, and details are not described herein again.

S408: The NFCC determines whether the SAP corresponding to the SN included in the SDREQ can be found.

In this embodiment of the present invention, when a determining result in step S408 is that the SAP corresponding to the SN included in the SDREQ can be found, the NFCC performs step S409. When a determining result in step S408 is that the SAP corresponding to the SN included in the SDREQ cannot be found, the NFCC performs step S411.

It should be noted that, in this embodiment of the present invention, when the determining result in this step is that the SAP corresponding to the SN included in the SDREQ cannot be found, the NFCC may allocate a corresponding SAP to the SN, and then perform step S409.

S409: The NFCC generates an SDRES including the SAP, returns the SDRES to the second NFC device by using an SNL PDU, and waits for another LLC PDU sent by the second NFC device.

S410: The NFCC activates the LLCP high radio frequency interface and sends a report to the DH.

S411: The NFCC does not make a reply, or directly generates reply information including an error indication and returns the reply information to the second NFC device.

S412: The NFCC processes the LLC PDU, and activates the LLCP high radio frequency interface.

S413: The NFCC determines whether a value of a DSAP field in a packet header of the LLC PDU is equal to 01h.

In this embodiment of the present invention, when a determining result in step S413 is that the value of the DSAP field in the packet header of the LLC PDU is equal to 01h, the NFCC performs step S414. When a determining result in step S413 is that the value of the DSAP field in the packet header of the LLC PDU is not equal to 01h, the NFCC performs step S412.

It should be noted that, for a process of determining a CONNECT PDU, other manners described in the foregoing embodiment may be used, and details are not described herein again.

S414: The NFCC determines whether an SN can be parsed out from the information field of the LLC PDU.

In this embodiment of the present invention, when a determining result in step S414 is that an SN can be parsed out from the information field of the LLC PDU, the NFCC performs step S415. When a determining result in step S414 is that an SN cannot be parsed out from the information field of the LLC PDU, the NFCC performs step S411.

S415: The NFCC queries the service information for the SN and/or an SAP corresponding to the SN.

It should be noted that, an objective of this step is that the NFCC checks whether there is a service having a service name of the SN on the first NFC device, or further, checks whether the first NFC device allocates a corresponding SAP to the service having a service name of the SN.

S416: The NFCC determines whether the SN and/or the SAP corresponding to the SN can be found.

In this embodiment of the present invention, when a determining result in step S416 is that the SN and/or the SAP corresponding to the SN can be found, the NFCC performs step S417. When a determining result in step S416 is that the SN and/or the SAP corresponding to the SN cannot be found (that is, the NFCC fails to find a service having a service name of the SN, or fails to find a corresponding SAP having a service name of the SN), the NFCC performs step S420.

S417: The NFCC performs a service discovery procedure, that is, generates an SDREQ including the SN, sends the SDREQ to the second NFC device by using an SNL PDU, and receives an SNL PDU that is sent by the second NFC device in response to the SDREQ and that includes an SDRES.

In this embodiment of the present invention, the SDRES includes an SAP that is found by an NFCC of the second NFC device by querying service information stored in the NFCC and that corresponds to the SN in step S416, or an SAP that is allocated by the NFCC of the second NFC device to the SN in step S416.

S418: The NFCC activates the LLCP high radio frequency interface and sends a report to the DH.

In this embodiment of the present invention, a manner of activating the LLCP high radio frequency interface by the NFCC is similar to a manner, defined in the NCI protocol, of activating another radio frequency interface, and a manner of sending a report to the DH after activating the radio frequency interface is also similar to that defined in the NCI protocol, and details are not described herein.

S419: The NFCC sends, to the DH, a result of performing the service discovery procedure and the CONNECT PDU that is received or parsed out; or modifies, according to the SDRES, the CONNECT PDU that is received or parsed out (that is, updates a DSAP in the CONNECT PDU to an SAP in the received SDRES) and sends the CONNECT PDU to the DH, so that the DH generates a CC PDU and makes a reply; or generates a CC PDU and sends the CC PDU to the second NFC device, and then sends, to the DH, indication information corresponding to the LLC PDU (the same as the indication information corresponding to the LLC PDU in the foregoing embodiment, and details are not described herein again) and indication information used to indicate that a data link connection is successfully established.

S420: The NFCC generates a disconnected mode protocol data unit (DM PDU) including a reject cause, and sends the DM PDU to the second NFC device.

It should be noted that, the reject cause in the DM PDU is used to indicate a specific reason that the first NFC device does not establish a data link connection to the second NFC device.

In this embodiment of the present invention, an NFCC can perform a service discovery procedure before activating an LLCP high radio frequency interface supported by the NFCC, and the NFCC activates the LLCP high radio frequency interface after performing the service discovery procedure, and sends a report to a DH. Therefore, interactions between the DH and the NFCC may be reduced before the LLCP high radio frequency interface is activated, and resource overheads of the DH may be reduced, so that the NFCC can freely interact with an NFC device at a peer end to some degree. That is, the NFCC can perform some functions of the DH, such as the service discovery procedure, which conforms to a trend that a logical interface between the DH and the NFCC develops towards upper layers in a point-to-point mode.

Figure 5:
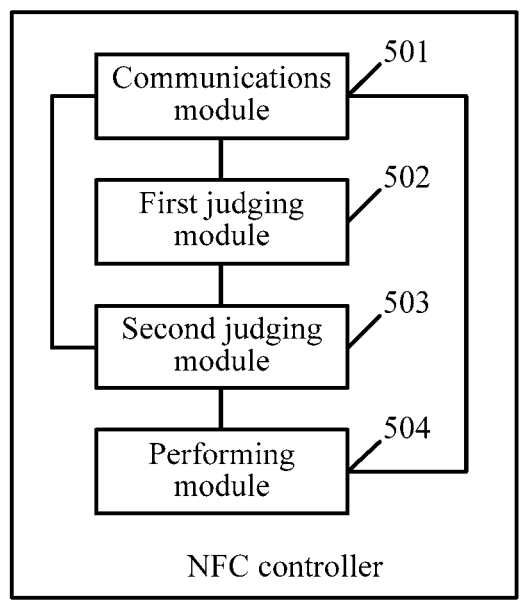
FIG. 5 is schematic structural diagram of an NFC controller according to an embodiment of the present invention.

Referring to FIG. 5, FIG. 5 is schematic structural diagram of an NFC controller according to an embodiment of the present invention. The NFC controller shown in FIG. 5 is an NFC controller in a first NFC device, and the first NFC device further includes a DH. As shown in FIG. 5, the NFC controller may include a communications module 501, a first judging module 502, a second judging module 503, and a performing module 504.

The communications module 501 is configured to receive an LLC PDU.

Figure 10:
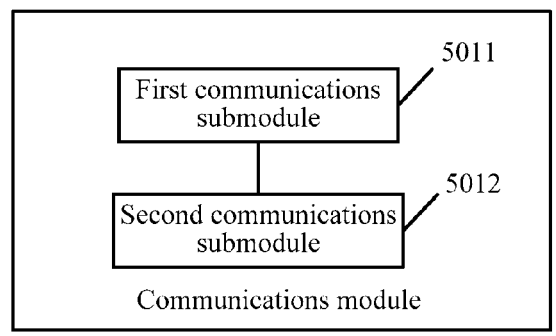
FIG. 10 is schematic structural diagram of a communications module in an NFC controller according to an embodiment of the present invention.

In this embodiment of the present invention, the communications module 501 may include a first communications submodule 5011 configured to communicate with the DH and a second communications submodule 5012 configured to communicate with a second NFC device. In this case, a schematic structural diagram of the communications module 501 may be shown in FIG. 10. FIG. 10 is schematic structural diagram of a communications module in an NFC controller according to an embodiment of the present invention. In addition, a specific manner of receiving an LLC PDU by the communications module 501 is: receiving, by the first communications submodule 5011, an LLC PDU sent by the DH; and receiving, by the second communications submodule 5012, an LLC PDU sent by the second NFC device.

The first judging module 502 is configured to determine, according to a type identifier in a packet header of the LLC PDU, whether the LLC PDU is a target LLC PDU.

In this embodiment of the present invention, when a determining result of the first judging module 502 is that the LLC PDU is a target LLC PDU, the second judging module 503 determines whether a service discovery procedure needs to be performed. When a determining result of the first judging module 502 is that the LLC PDU is not a target LLC PDU and the LLC PDU is a PDU sent by the second NFC device, the NFC controller may send the LLC PDU to the DH by using the first communications submodule 5011 of the communications module 501. Alternatively, when a function corresponding to the LLC PDU can be performed on the NFC controller as a radio frequency interface function extension (that is, RF interface extension defined in the NCI protocol, refer to the NCI protocol for specific content, and details are not described herein) by means of a current activated radio frequency interface (that is, an RF interface defined in the NCI protocol, refer to the NCI protocol for specific content, and details are not described herein), the NFC controller directly processes the LLC PDU and makes a reply. When a determining result of the first judging module 502 is that the LLC PDU is not a target LLC PDU and the LLC PDU is a PDU sent by the DH, the NFC controller may send the LLC PDU to the second NFC device by using the second communications submodule 5012 of the communications module 501.

In this embodiment of the present invention, the target LLC PDU may include but is not limited to a first CONNECT PDU sent by the DH or the second NFC device, an SNL PDU sent by the second NFC device, an aggregated frame protocol data unit (AGF PDU) sent by the second NFC device, and the like. The AGF PDU may include a CONNECT PDU and/or an SNL PDU. This is not limited in this embodiment of the present invention.

The second judging module 503 is configured to: when a determining result of the first judging module 502 is that the LLC PDU is a target LLC PDU, determine whether a service discovery procedure needs to be performed.

In this embodiment of the present invention, when a determining result of the second judging module 503 is that a service discovery procedure needs to be performed, the performing module 504 of the NFC controller performs the service discovery procedure. When a determining result of the second judging module 503 is that a service discovery procedure does not need to be performed and the LLC PDU is an LLC PDU sent by the second NFC device, the NFC controller may send the LLC PDU to the DH by using the first communications submodule 5011 of the communications module 501. When a determining result of the second judging module 503 is that a service discovery procedure does not need to be performed and the LLC PDU is an LLC PDU sent by the DH, the NFC controller sends the LLC PDU to the second NFC device by using the second communications submodule 5012 of the communications module 501.

The performing module 504 is configured to perform the service discovery procedure when the determining result of the second judging module 503 is that the service discovery procedure needs to be performed.

In an optional implementation, the first communications submodule 5011 of the communications module 501 may be further configured to: before the performing module 504 performs the service discovery procedure, receive a start command sent by the DH. The start command is used to command the NFC controller to start a function of performing a service discovery procedure. A precondition under which the first communications submodule 5011 of the communications module 501 receives the start command sent by the DH is that the DH determines that the NFC controller has a capability of performing a service discovery procedure. A specific manner of determining, by the DH, that the NFC controller has a capability of performing a service discovery procedure includes but is not limited to the following two manners: 1. Before determining that a service discovery procedure needs to be performed by the NFC controller, the DH actively sends, to the NFC controller, a query request used to query whether the NFC controller has a capability of performing a service discovery procedure, so that the NFC controller responds to the query request and reports capability information to the DH by using the first communications submodule 5011 of the communications module 501. The capability information is used to indicate that the NFC controller has the capability of performing a service discovery procedure. 2. When the NFC controller is initialized, the NFC controller reports capability information to the DH by using the first communications submodule 5011 of the communications module 501. The capability information is used to indicate that the NFCC has the capability of performing a service discovery procedure. In this embodiment of the present invention, a precondition under which the first communications submodule 5011 of the communications module 501 of the NFC controller receives a start command sent by the DH is that a frame radio frequency interface, an NFC-DEP radio frequency interface, or an LLCP high radio frequency interface has been activated.

Figure 6:
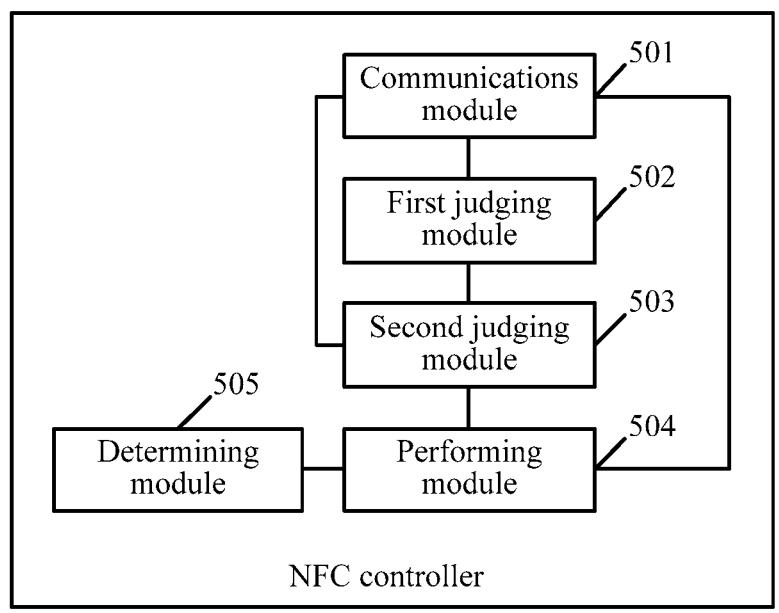
FIG. 6 is schematic structural diagram of another NFC controller according to an embodiment of the present invention.

In another optional implementation, based on the structure of the NFC controller shown in FIG. 5, the NFC controller may further include a determining module 505, and a structure of the NFC controller including the determining module 505 is shown in FIG. 6. FIG. 6 is schematic structural diagram of another NFC controller according to an embodiment of the present invention.

The determining module 505 is configured to determine that the NFC controller has a capability of performing a service discovery procedure.

In this embodiment of the present invention, when the determining module 505 determines that the NFC controller has the capability of performing a service discovery procedure, after the performing module 504 performs the service discovery procedure, the NFC controller may activate the LLCP high radio frequency interface and sends a report to the DH by using the first communications submodule 5011 of the communications module 501.

In an optional implementation, the first communications submodule 5011 of the communications module 501 may be further configured to: before the LLC PDU is received, report capability information to the DH. The capability information is used to indicate that the NFC controller has the capability of performing a service discovery procedure.

In this embodiment of the present invention, a specific manner of reporting capability information to the DH by the first communications submodule 5011 of the communications module 501 is described in the foregoing embodiment, and details are not described herein again.

In an optional implementation, when the LLC PDU received by the communications module 501 is an SNL PDU sent by the second NFC device, a specific manner of determining, by the second judging module 503, whether a service discovery procedure needs to be performed may be:

determining whether a parameter included in an information field of the SNL PDU is a first SDREQ, and if the parameter included in the information field of the SNL PDU is a first SDREQ, determining that a service discovery procedure needs to be performed; or if the parameter included in the information field of the SNL PDU is not a first SDREQ, determining that a service discovery procedure does not need to be performed.

A specific manner of performing the service discovery procedure by the performing module 504 may be:

determining, from prestored service information, a first SAP corresponding to a first SN included in the first SDREQ, where the service information includes at least one SN and an SAP corresponding to each SN; and generating a first SDRES including the first SAP, and sending the first SDRES to the second NFC device by using the second communications submodule 5012 of the communications module 501.

In this embodiment of the present invention, the service information may be service information that is received by the first communications submodule 5011 of the communications module 501 and that is directly configured for the NFC controller by the DH after the DH receives the capability information. A manner of receiving, by the first communications submodule 5011 of the communications module 501, service information sent by the DH is described in the foregoing embodiment, and details are not described herein again. Alternatively, the service information may be service information that is received by the first communications submodule 5011 of the communications module 501 and that is included in the start command sent by the DH. The service information may include at least one SN, or may include at least one SN and an SAP corresponding to each SN, or may include one or more SNs and an SAP corresponding to each of some SNs of the one or more SNs. This is not limited in this embodiment of the present invention. In addition, when the service information includes at least one SN, after the first communications submodule 5011 of the communications module 501 receives the service information, the NFC controller allocates an SAP corresponding to each SN in the service information.

In an optional implementation, when the LLC PDU is the first CONNECT PDU, a specific manner of determining, by the second judging module 503, whether a service discovery procedure needs to be performed is:

determining whether a value of a DSAP field in a packet header of the first CONNECT PDU is equal to a preset value 01h; and when the value of the DSAP field is equal to the preset value 01h, determining whether a second SN can be parsed out from an information field of the first CONNECT PDU.

When the second judging module 503 determines that a second SN can be parsed out from the information field of the first CONNECT PDU, a specific manner of performing the service discovery procedure by the performing module 504 is:

generating a second SDREQ including the second SN, and sending the second SDREQ to the second NFC device by using the second communications submodule 5012 of the communications module 501; and then receiving, by using the second communications submodule 5012 of the communications module 501, a second SDRES that is sent by the second NFC device in response to the second SDREQ. The second SDRES includes a second SAP, and the second SAP may be an SAP allocated by an NFC controller of the second NFC device to the second SN, or may be an SAP that is found by the NFC controller of the second NFC device by querying stored service information and that corresponds to the second SN.

Figure 7:
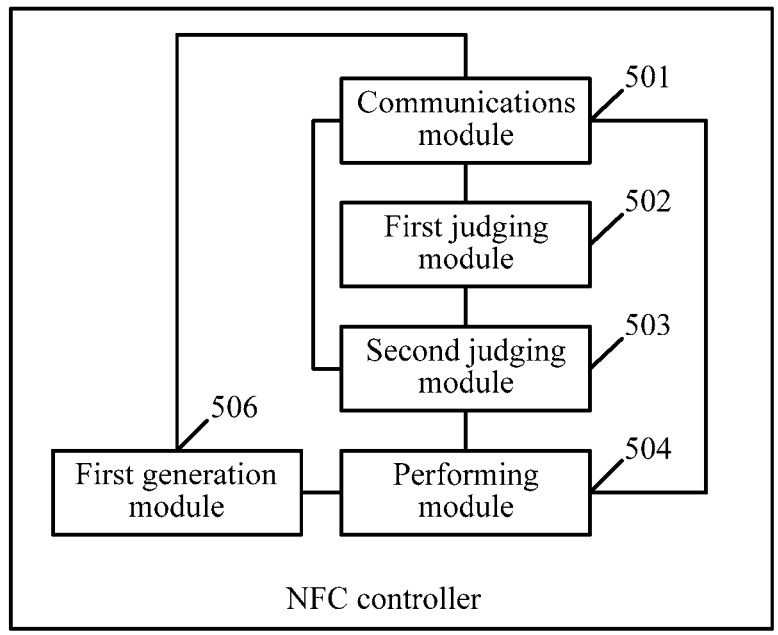
FIG. 7 is schematic structural diagram of still another NFC controller according to an embodiment of the present invention.

In an optional implementation, based on the structure of the NFC controller shown in FIG. 5, the NFC controller may further include a first generation module 506, and a structure of the NFC controller including the first generation module 506 is shown in FIG. 7. FIG. 7 is schematic structural diagram of still another NFC controller according to an embodiment of the present invention.

The first generation module 506 is configured to: when the first CONNECT PDU is sent by the DH, after the performing module 504 performs the service discovery procedure, generate a second CONNECT PDU. An SSAP in the second CONNECT PDU is an SSAP in the first CONNECT PDU or a third SAP that is found by the NFC controller shown in FIG. 7 by querying prestored service information and that corresponds to the second SN. A DSAP in the second CONNECT PDU is the second SAP. The service information includes at least one SN and an SAP corresponding to each SN. The service information is service information that is received by the first communications submodule 5011 of the communications module 501 and that is configured by the DH. A specific manner of receiving the service information by the first communications submodule 5011 of the communications module 501 is described in the foregoing embodiment, and details are not described herein again.

In this embodiment of the present invention, the second communications submodule 5012 of the communications module 501 may be further configured to send the second CONNECT PDU to the second NFC device.

In this embodiment of the present invention, when the LLC PDU is a CONNECT PDU sent by the DH, the second judging module 503 may be further configured to determine whether a DSAP in a packet header of the CONNECT PDU is 01h and whether an SSAP is a valid value (that is, another value other than 00h and 01h). If the DSAP in the packet header of the CONNECT PDU is 01h and the SSAP is a valid value, the second communications submodule 5012 of the communications module 501 of the NFC controller may directly send the CONNECT PDU to the second NFC device at a peer end. Alternatively, the second judging module 503 first determines whether an SN in an information field of the CONNECT PDU and the SSAP in the packet header are a pair of service information stored in the NFC controller. If the SN in the information field of the CONNECT PDU and the SSAP in the packet header are a pair of service information stored in the NFC controller, the second communications submodule 5012 of the communications module 501 of the NFC controller sends the CONNECT PDU to the second NFC device at the peer end. If the SN in the information field of the CONNECT PDU and the SSAP in the packet header are not a pair of service information stored in the NFC controller, the performing module 504 performs the service discovery procedure, and after the performing module 504 performs the service discovery procedure, the first generation module 506 regenerates a CONNECT PDU. If the DSAP in the packet header of the CONNECT PDU is 01h and the SSAP is an invalid value (such as 00h or 01h), the second communications submodule 5012 of the communications module 501 of the NFC controller may directly send the CONNECT PDU to the second NFC device. Alternatively, the performing module 504 performs the service discovery procedure, and after the performing module 504 performs the service discovery procedure, the first generation module 506 regenerates a CONNECT PDU. Alternatively, after the SN in the information field of the CONNECT PDU is parsed out, an SAP corresponding to the SN is found or a corresponding SAP is allocated to the SN, and then the first generation module 506 regenerates a CONNECT PDU. If the DSAP in the packet header of the CONNECT PDU is another value other than 00h and 01h, the second communications submodule 5012 of the communications module 501 of the NFC controller directly sends the CONNECT PDU to the second NFC device at the peer end.

Figure 8:
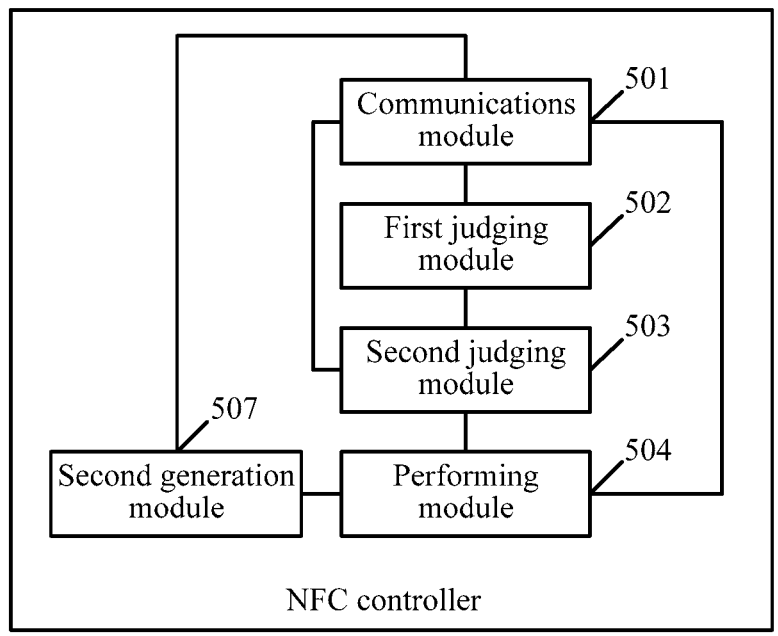
FIG. 8 is schematic structural diagram of still another NFC controller according to an embodiment of the present invention.

In an optional implementation, based on the structure of the NFC controller shown in FIG. 5, the NFC controller may further include a second generation module 507, and a structure of the NFC controller including the second generation module 507 is shown in FIG. 8. FIG. 8 is schematic structural diagram of still another NFC controller according to an embodiment of the present invention.

The second generation module 507 is configured to: when the first CONNECT PDU is sent by the second NFC device, after the performing module 504 performs the service discovery procedure, generate a CC PDU. An SSAP in the CC PDU is a fourth SAP that is in prestored service information and that corresponds to the second SN. A DS AP in the CC PDU is the second SAP. The CC PDU is used to indicate that a data link between the first NFC device and the second NFC device is successfully established. The service information includes at least one SN and an SAP corresponding to each SN. The service information is service information that is received by the first communications submodule 5011 of the communications module 501 and that is configured by the DH. A specific manner of receiving the service information by the first communications submodule 5011 of the communications module 501 is described in the foregoing embodiment, and details are not described herein again.

In this embodiment of the present invention, the second communications submodule 5012 of the communications module 501 may be further configured to send the CC PDU to the second NFC device. The first communications submodule 5011 of the communications module 501 may be further configured to send, to the DH, indication information corresponding to the first CONNECT PDU and indication information used to indicate that the data link connection is successfully established. The indication information corresponding to the first CONNECT PDU may include but is not limited to the second SAP and a PDU type of the first CONNECT PDU. The PDU type of the first CONNECT PDU is used to indicate that the second NFC device requests to establish a data link connection to the first NFC device.

In this embodiment of the present invention, when an LLC PDU received by the communications module 501 is a CONNECT PDU sent by the second NFC device at the peer end, the second judging module 503 may further determine whether a DSAP in a packet header of the CONNECT PDU is 01h and whether an SSAP is a valid value (that is, another value other than 00h and 01h). If the DSAP in the packet header of the CONNECT PDU is 01h and the SSAP is a valid value, the performing module 504 of the NFC controller performs the service discovery procedure, or may find an SAP corresponding to an SN or allocate a corresponding SAP to the SN after parsing out the SN in the information field of the CONNECT PDU, and then the first communications submodule 5011 of the communications module 501 directly forwards the CONNECT PDU to the DH. If the DSAP is 01h and the SSAP is an invalid value, the performing module 504 performs the service discovery procedure, and after the service discovery procedure is performed, the second generation module 507 generates a CC PDU, and the second communications submodule 5012 of the communications module 501 sends the CC PDU to the second NFC device at the peer end. If the DSAP is another value other than 00h and 01h and the SSAP is a valid value, the first communications submodule 5011 of the communications module 501 of the NFC controller may directly forward the CONNECT PDU to the DH. If the DSAP is another value other than 00h and 01h and the SSAP is an invalid value, after the NFC controller finds an SN corresponding to the DSAP by querying the service information stored in the NFCC, the performing module 504 may perform the service discovery procedure, then the second generation module 507 generates a CC PDU, and finally the second communications submodule 5012 of the communications module 501 sends the CC PDU to the second NFC device at the peer end.

In this embodiment of the present invention, interactions between the NFC controller and a DH are reduced. That is, the NFCC performs a service discovery procedure, and therefore, does not need to interact with the DH, thereby reducing resource overheads of the DH. In addition, when performing the service discovery procedure, the NFC controller needs to have a capability of parsing an LLC PDU, but the NFC controller only needs to first parse a packet header of an LLC PDU, and then parse a particular LLC PDU, and does not need to parse information fields of all LLC PDUs (currently, there are 14 types of LLC PDUs) specified in the LLCP. Therefore, overheads of the NFCC caused by parsing the particular LLC PDU by the NFC controller are relatively small, and therefore, RF communication is not affected. In addition, in this embodiment of the present invention, the NFC controller can perform some functions of the DH, such as the service discovery procedure, which conforms to a trend that a logical interface between the DH and the NFC controller develops towards upper layers in a point-to-point mode. In addition, in this embodiment, before the DH and the NFCC transmit upper-layer information, even if the DH is in a standby state, the NFCC can still complete the service discovery procedure, thereby preparing for subsequent exchanges of upper-layer information.

Figure 9:
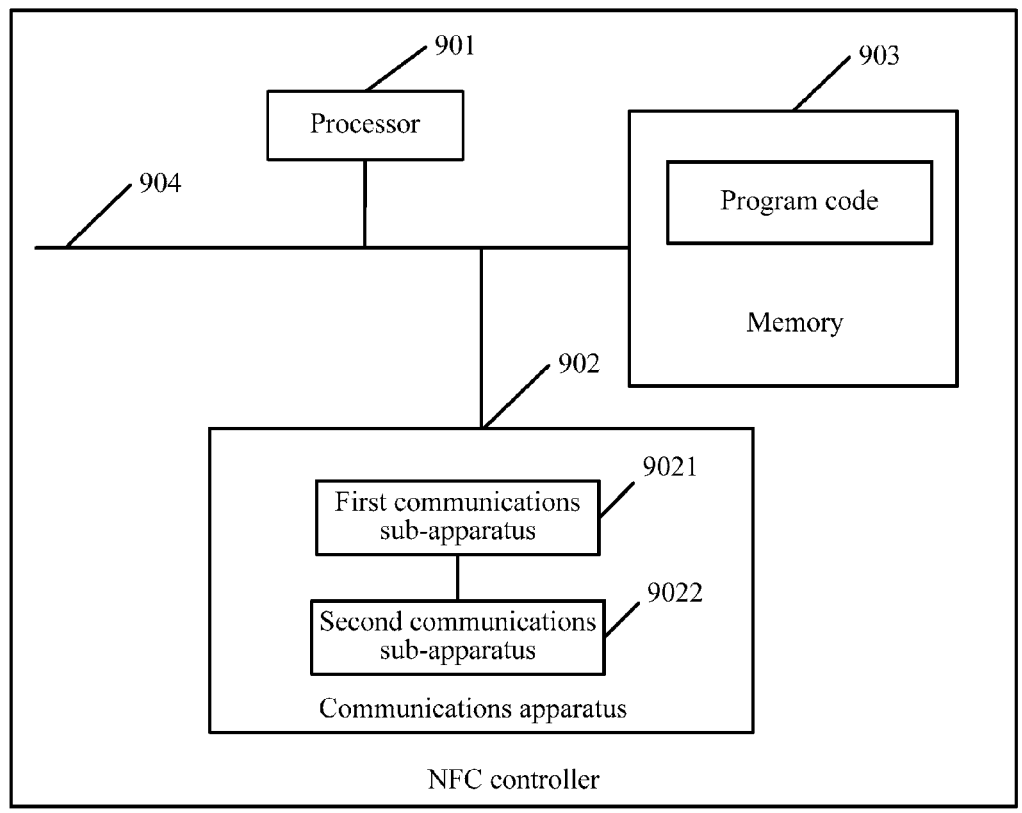
FIG. 9 is schematic structural diagram of still another NFC controller according to an embodiment of the present invention.

Referring to FIG. 9, FIG. 9 is schematic structural diagram of still another NFC controller according to an embodiment of the present invention. The NFC controller shown in FIG. 9 is an NFC controller in a first NFC device, and the first NFC device further includes a DH. As shown in FIG. 9, the NFC controller may include: at least one processor 901, such as a CPU; a communications apparatus 902, which may include a first communications sub-apparatus 9021 configured to communicate with the DH, such as an interface between the DH and the NFCC, where the interface may support the NCI protocol at an upper layer, and may transmit data at a bottom layer by using a universal asynchronous receiver/transmitter (UART), an I2C bus (Inter-Integrated Circuit), a serial peripheral interface (SPI), or the like, and may include a second communications sub-apparatus 9022 configured to communicate with a second NFC device, such as a transceiver circuit in the NFC controller, where a working frequency of an NFC antenna in the transceiver circuit may be 13.56 MHz, and the NFC controller may send data to the second NFC device and receive data from the second NFC device by using the NFC antenna; a memory 903; and at least one communications bus 904. The memory 903 may be a high-speed RAM memory, or may be a non-volatile memory, such as at least one magnetic disk memory, and optionally, the memory 903 may be at least one storage apparatus that is located far away from the processor 901.

The communications bus 904 is configured to implement connection and communication between the components.

The communications apparatus 902 is configured to receive an LLC PDU.

Specifically, the first communications sub-apparatus 9021 of the communications apparatus 902 is configured to receive an LLC PDU sent by the DH, and the second communications sub-apparatus 9022 of the communications apparatus 902 is configured to receive an LLC PDU sent by the second NFC device.

The memory 903 stores a set of program code, and the processor 901 invokes the program code stored in the memory 903, to perform the following operations:

determining, according to a type identifier in a packet header of the LLC PDU, whether the LLC PDU is a target LLC PDU, where the target LLC PDU includes a first CONNECT PDU sent by the DH or by the second NFC device, an SNL PDU sent by the second NFC device, or an AGF PDU sent by the second NFC device, and the AGF PDU may include a CONNECT PDU and/or an SNL PDU, and this is not limited in this embodiment of the present invention; and when the LLC PDU is the target LLC PDU, determining whether a service discovery procedure needs to be performed, and if the service discovery procedure needs to be performed, performing the service discovery procedure.

In an embodiment, when the LLC PDU is an SNL PDU sent by the second NFC device, a specific manner of determining, by the processor 901, whether a service discovery procedure needs to be performed may be:

determining whether a parameter included in an information field of the SNL PDU is a first SDREQ; and when a determining result is that the parameter included in the information field of the SNL PDU is a first SDREQ, the processor 901 needs to perform the service discovery procedure.

A specific manner of performing, by the processor 901, the service discovery procedure may be:

determining, from prestored service information, a first SAP corresponding to a first SN included in the first SDREQ, where the service information includes at least one SN and an SAP corresponding to each SN; and generating a first SDRES including the first SAP, and sending the first SDRES to the second NFC device by using the second communications sub-apparatus 9022 of the communications apparatus 902.

In an embodiment, when the LLC PDU is the first CONNECT PDU, a specific manner of determining, by the processor 901, whether a service discovery procedure needs to be performed may be:

determining whether a value of a DSAP field in a packet header of the first CONNECT PDU is equal to a preset value 01h; and when the value of the DSAP field is equal to the preset value 01h, determining whether a second SN can be parsed out from an information field of the first CONNECT PDU, where when a second SN is parsed out, the processor 901 needs to perform the service discovery procedure.

A specific manner of performing, by the processor 901, the service discovery procedure is:

generating a second SDREQ including the second SN, and sending the second SDREQ to the second NFC device by using the second communications sub-apparatus 9022 of the communications apparatus 902; and receiving, by using the second communications sub-apparatus 9022 of the communications apparatus 902, a second SDRES that is sent by the second NFC device in response to the second SDREQ. The second SDRES includes a second SAP. The second SAP may be an SAP allocated by the NFC controller of the second NFC device to the second SN, or may be an SAP that is found by an NFC controller of the second NFC device by querying stored service information and that corresponds to the second SN.

In an embodiment, the processor 901 is configured to invoke the program code stored in the memory 903, to further perform the following operation:

when the first CONNECT PDU is sent by the DH, after the service discovery procedure is performed, generating a second CONNECT PDU, where an SSAP in the second CONNECT PDU is an SSAP in the first CONNECT PDU or a third SAP that is found by the NFC controller by querying prestored service information and that corresponds to the second SN; a DSAP in the second CONNECT PDU is the second SAP; and the service information includes at least one SN and an SAP corresponding to each SN.

The second communications sub-apparatus 9022 of the communications apparatus 902 may be further configured to send the second CONNECT PDU to the second NFC device.

In an embodiment, the processor 901 is configured to invoke the program code stored in the memory 903, to further perform the following operation:

when the first CONNECT PDU is sent by the second NFC device, after the service discovery procedure is performed, generating a CC PDU, where an SSAP in the CC PDU is a fourth SAP that is in prestored service information and that corresponds to the second SN, a DSAP in the CC PDU is the second SAP, the CC PDU is used to indicate that a data link connection between the first NFC device and the second NFC device is successfully established, and the service information includes at least one SN and an SAP corresponding to each SN.

The second communications sub-apparatus 9022 of the communications apparatus 902 may be further configured to send the CC PDU to the second NFC device. The first communications submodule 9021 of the communications module 902 may be further configured to send, to the DH, indication information corresponding to the first CONNECT PDU and indication information used to indicate that the data link connection is successfully established. The indication information corresponding to the first CONNECT PDU may include but is not limited to the second SAP and a PDU type of the first CONNECT PDU. The PDU type of the first CONNECT PDU is used to indicate that the second NFC device requests to establish a data link connection to the first NFC device.

In an embodiment, the first communications sub-apparatus 9021 of the communications apparatus 902 may be further configured to: before the processor 901 performs the service discovery procedure, receive a start command sent by the DH. The start command is used to command the NFC controller to start a function of performing a service discovery procedure.

In an embodiment, the processor 901 is configured to invoke the program code stored in the memory 903, to further perform the following operation:

determining that the NFC controller has a capability of performing a service discovery procedure.

In an embodiment, the first communications sub-apparatus 9021 of the communications apparatus 902 may be further configured to report capability information to the DH. The capability information is used to indicate that the NFC controller has a capability of performing a service discovery procedure.

In an embodiment, the service information may be service information that is received by the first communications sub-apparatus 9021 of the communications apparatus 902 and that is directly configured for the NFC controller by the DH after the DH receives the capability information. A manner of receiving, by the first communications sub-apparatus 9021 of the communications apparatus 902, service information sent by the DH is described in the foregoing embodiment, and details are not described herein again. Alternatively, the service information may be service information that is received by the first communications sub-apparatus 9021 of the communications apparatus 902 and that is included in the start command sent by the DH. The service information may include at least one SN, or may include at least one SN and an SAP corresponding to each SN, or may include one or more SNs and an SAP corresponding to each of some SNs of the one or more SNs. This is not limited in this embodiment of the present invention. In addition, when the service information includes at least one SN, after the first communications sub-apparatus 9021 of the communications apparatus 902 receives the service information, the processor 901 of the NFC controller allocates an SAP corresponding to each SN in the service information.

In this embodiment of the present invention, interactions between the NFC controller and a DH are reduced. That is, the NFCC performs a service discovery procedure, and therefore, does not need to interact with the DH, thereby reducing resource overheads of the DH. In addition, when performing the service discovery procedure, the NFC controller needs to have a capability of parsing an LLC PDU, but the NFC controller only needs to first parse a packet header of an LLC PDU, and then parse a particular LLC PDU, and does not need to parse information fields of all LLC PDUs (currently, there are 14 types of LLC PDUs) specified in the LLCP. Therefore, overheads of the NFCC caused by parsing the particular LLC PDU by the NFC controller are relatively small, and therefore, RF communication is not affected. In addition, in this embodiment of the present invention, the NFC controller can perform some functions of the DH, such as the service discovery procedure, which conforms to a trend that a logical interface between the DH and the NFC controller develops towards upper layers in a point-to-point mode. In addition, in this embodiment, before the DH and the NFCC transmit upper-layer information, even if the DH is in a standby state, the NFCC can still complete the service discovery procedure, thereby preparing for subsequent exchanges of upper-layer information.

It should be noted that, the NFC device (the first NFC device and the second NFC device) mentioned in the foregoing embodiments is a device that has an NFC function or that succeeds in testing and qualification by the NFC Forum, and may include but is not limited to a mobile phone, a mobile computer, a tablet computer, a personal digital assistant (PDA), a wearable device, and the like. This is not limited in this embodiment of the present invention.

It should be noted that, in the foregoing embodiments, the description of each embodiment has respective focuses. For a part that is not described in detail in an embodiment, reference may be made to related descriptions in other embodiments. In addition, a person of ordinary skill in the art should learn that the embodiments described in the specification are all preferred embodiments, and the operations and modules involved in the embodiments are not necessarily what the present invention needs.

The steps in the embodiment methods of the present invention may be adjusted in order, merged, and deleted according to actual needs.

In the embodiments of the present invention, modules and submodules in the NFC controller may be combined, divided, or removed according to an actual requirement.

In the embodiments of the present invention, the modules and the submodules may be implemented by using a universal integrated circuit, for example, a CPU (central processing unit), or by using an ASIC (application specific integrated circuit).

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM).

The Logical Link Control Protocol (LLCP) based service discovery method and the NFC controller that are disclosed in the embodiments of the present invention are described in detail above. The principle and implementation of the present invention are described herein by using specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limit to the present invention.

What is claimed is:

1. A Logical Link Control Protocol (LLCP) based service discovery method applied to a near field communication controller (NFCC) of a first near field communication (NFC) device, wherein the first NFC device further comprises a device host (DH), and wherein the method comprises:
   receiving, by the NFCC, a Logical Link Control protocol data unit (LLC PDU);
   determining, by the NFCC according to a type identifier in a packet header of the LLC PDU, whether the LLC PDU is a target LLC PDU, wherein the target LLC PDU comprises a first connect protocol data unit (CONNECT PDU) sent by the DH or a second NFC device, a service name lookup protocol data unit (SNL PDU) sent by the second NFC device, or an aggregated frame protocol data unit (AGF PDU) sent by the second NFC device;
   when the LLC PDU is the target LLC PDU, determining, by the NFCC based on the LLC PDU whether a service discovery procedure needs to be performed; and
   if the service discovery procedure needs to be performed, performing, by the NFCC, the service discovery procedure.

2. The method according to claim 1, wherein the LLC PDU is the SNL PDU, and wherein:
   determining, by the NFCC, whether the service discovery procedure needs to be performed comprises:
      determining, by the NFCC, whether a parameter comprised in an information field of the SNL PDU is a first service discovery request (SDREQ); and performing, by the NFCC, the service discovery procedure comprises:
      determining, by the NFCC from prestored service information, a first service access point (SAP) corresponding to a first service name (SN) comprised in the first SDREQ, wherein the service information comprises at least one SN and an SAP corresponding to each SN, and
      generating, by the NFCC, a first service discovery response (SDRES) comprising the first SAP, and sending the first SDRES to the second NFC device.

3. The method according to claim 2, wherein the service information is sent to the NFCC by the DH.

4. The method according to claim 1, wherein the LLC PDU is the first CONNECT PDU, and wherein:
   determining, by the NFCC, whether a service discovery procedure needs to be performed comprises:
      determining, by the NFCC, whether a value of a target service access point (DSAP) field in a packet header of the first CONNECT PDU is equal to a preset value, and
      determining, by the NFCC when the value of the DSAP field is equal to the preset value, whether a second service name (SN) can be parsed out from an information field of the first CONNECT PDU; and
   performing, by the NFCC, the service discovery procedure comprises:
      generating, by the NFCC, a second service discovery request (SDREQ) comprising the second SN, and sending the second SDREQ to the second NFC device, and
      receiving, by the NFCC, a second service discovery response (SDRES) that is sent by the second NFC device in response to the second SDREQ, wherein the second SDRES comprises a second service access point (SAP).

5. The method according to claim 4, wherein the first CONNECT PDU is sent by the DH, and after performing, by the NFCC, the service discovery procedure, the method further comprises:
   generating, by the NFCC, a second CONNECT PDU, and sending the second CONNECT PDU to the second NFC device, wherein a source service access point (SSAP) in the second CONNECT PDU is an SSAP in the first CONNECT PDU or a third SAP that is found by the NFCC by querying prestored service information and that corresponds to the second SN, a DSAP in the second CONNECT PDU is the second SAP, and the service information comprises at least one SN and an SAP corresponding to each SN.

6. The method according to claim 5, wherein the service information is sent to the NFCC by the DH.

7. The method according to claim 4, wherein the first CONNECT PDU is sent by the second NFC device, and after performing, by the NFCC, the service discovery procedure, the method further comprises:
   generating, by the NFCC, a connect complete protocol data unit (CC PDU), and sending the CC PDU to the second NFC device, wherein an source service access point (SSAP) in the CC PDU is a fourth SAP that is in prestored service information and that corresponds to the second SN, a DSAP in the CC PDU is the second SAP, the CC PDU is used to indicate that a data link connection between the first NFC device and the second NFC device is successfully established, and the service information comprises at least one SN and an SAP corresponding to each SN; and
   sending, by the NFCC to the DH, indication information corresponding to the first CONNECT PDU and indication information used to indicate that the data link connection is successfully established, wherein the indication information corresponding to the first CONNECT PDU comprises the second SAP.

8. The method according to claim 1, wherein the AGF PDU comprises at least one SNL PDU and/or at least one CONNECT PDU.

9. The method according to claim 1, wherein before performing, by the NFCC, the service discovery procedure, the method further comprises:
   receiving, by the NFCC, a start command sent by the DH, wherein the start command is used to command the NFCC to start a function of performing the service discovery procedure; or
   determining, by the NFCC, that the NFCC has a capability of performing the service discovery procedure.

10. The method according to claim 1, wherein before receiving, by the NFCC, the LLC PDU, the method further comprises:
   reporting, by the NFCC, capability information to the DH, wherein the capability information is used to indicate that the NFCC has a capability of performing a service discovery procedure.

11. A near field communication (NFC) controller in a first NFC device, wherein the first NFC device further comprises a device host (DH), the NFC controller comprising:
   a memory;
   a processor; and
   a communications apparatus configured to receive a Logical Link Control protocol data unit (LLC PDU); and
   wherein the memory stores a set of program code, and the processor is configured to invoke the program code stored in the memory, to perform the following operations:

determining, according to a type identifier in a packet header of the LLC PDU, whether the LLC PDU is a target LLC PDU, wherein the target LLC PDU comprises a first connect protocol data unit (CONNECT PDU) sent by the DH or a second NFC device, a service name lookup protocol data unit (SNL PDU) sent by the second NFC device, or an Aggregated frame protocol data unit (AGF PDU) sent by the second NFC device; and when the LLC PDU is the target LLC PDU, determining, based on the LLC PDU, whether a service discovery procedure needs to be performed, and if the service discovery procedure needs to be performed, performing the service discovery procedure.

12. The NFC controller according to claim 11, wherein the LLC PDU is the SNL PDU and the processor is configured to invoke the program code stored in the memory, to further perform:

determining whether a parameter comprised in an information field of the SNL PDU is a first service discovery request (SDREQ); and determining, from prestored service information, a first service access point (SAP) corresponding to a first service name (SN) comprised in the first SDREQ, wherein the service information comprises at least one SN and an SAP corresponding to each SN; and generating a first service discovery response (SDRES) comprising the first SAP, and sending the first SDRES to the second NFC device via the communications apparatus.

13. The NFC controller according to claim 12, wherein the service information is sent to the NFC controller by the DH.

14. The NFC controller according to claim 11, wherein the LLC PDU is the first CONNECT PDU, and the processor is configured to invoke the program code stored in the memory, to further perform:

determining whether a value of a target service access point (DSAP) field in a packet header of the first CONNECT PDU is equal to a preset value; and determining, when the value of the DSAP field is equal to the preset value, whether a second service name (SN) can be parsed out from an information field of the first CONNECT PDU; and a specific manner of performing, by the processor, the service discovery procedure is:

generating a second service discovery request (SDREQ) comprising the second SN, and sending the second SDREQ to the second NFC device by using the communications apparatus; and receiving, by using the communications apparatus, a second service discovery response (SDRES) that is sent by the second NFC device in response to the second SDREQ, wherein the second SDRES comprises a second service access point (SAP).

15. The NFC controller according to claim 14, wherein the processor is configured to invoke the program code stored in the memory, to further perform:

when the first CONNECT PDU is sent by the DH, after the service discovery procedure is performed, generating a second CONNECT PDU, wherein an source service access point (SSAP) in the second CONNECT PDU is an SSAP in the first CONNECT PDU or a third SAP that is found by the NFC controller by querying prestored service information and that corresponds to the second SN, a DSAP in the second CONNECT PDU is the second SAP, and the service information comprises at least one SN and an SAP corresponding to each SN; and the communications apparatus is further configured to send the second CONNECT PDU to the second NFC device.

16. The NFC controller according to claim 15, wherein the service information is sent to the NFC controller by the DH.

17. The NFC controller according to claim 14, wherein the processor is configured to invoke the program code stored in the memory, to further perform:

when the first CONNECT PDU is sent by the second NFC device, after the service discovery procedure is performed, generating a connect complete protocol data unit (CC PDU), wherein an source service access point (SSAP) in the CC PDU is a fourth SAP that is in prestored service information and that corresponds to the second SN, a DSAP in the CC PDU is the second SAP, the CC PDU is used to indicate that a data link connection between the first NFC device and the second NFC device is successfully established, and the service information comprises at least one SN and an SAP corresponding to each SN; and the communications apparatus is further configured to send the CC PDU to the second NFC device, and send, to the DH, indication information corresponding to the first CONNECT PDU and indication information used to indicate that the data link connection is successfully established, wherein the indication information corresponding to the first CONNECT PDU comprises the second SAP.

18. The NFC controller according to claim 11, wherein the AGF PDU comprises at least one SNL PDU and/or at least one CONNECT PDU.

19. The NFC controller according to claim 11, wherein the communications apparatus is further configured to: before the processor performs the service discovery procedure, receive a start command sent by the DH, wherein the start command is used to command the NFC controller to start a function of performing the service discovery procedure; or the processor is configured to invoke the program code stored in the memory, to further perform the following operation:

determining that the NFC controller has a capability of performing the service discovery procedure.

20. The NFC controller according to claim 11, wherein the communications apparatus is further configured to report capability information to the DH, wherein the capability information is used to indicate that the NFC controller has a capability of performing a service discovery procedure.

* * * * *

UNITED STATES PATENT AND TRADEMARK OFFICE
CERTIFICATE OF CORRECTION

PATENT NO. : 10,237,902 B2
APPLICATION NO. : 15/566974
DATED : March 19, 2019
INVENTOR(S) : Zhao et al.

Page 1 of 1

It is certified that error appears in the above-identified patent and that said Letters Patent is hereby corrected as shown below:

In the Claims

Claim 11, Column 37, Line 8, "Aggregated frame protocol" should read -- aggregated frame protocol --.

Signed and Sealed this
Seventh Day of January, 2020

Andrei Iancu
*Director of the United States Patent and Trademark Office*